US011177750B2

(12) United States Patent
Sul et al.

(10) Patent No.: US 11,177,750 B2
(45) Date of Patent: Nov. 16, 2021

(54) MOTOR CONTROL APPARATUS

(71) Applicant: SEOUL NATIONAL UNIVERSITY R&DB FOUNDATION, Seoul (KR)

(72) Inventors: Seung-Ki Sul, Seoul (KR); Yong-Cheol Kwon, Seoul (KR); Joohyun Lee, Anyang-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 22 days.

(21) Appl. No.: 16/644,939

(22) PCT Filed: Sep. 19, 2018

(86) PCT No.: PCT/KR2018/011071
§ 371 (c)(1),
(2) Date: Mar. 5, 2020

(87) PCT Pub. No.: WO2019/059648
PCT Pub. Date: Mar. 28, 2019

(65) Prior Publication Data
US 2020/0366228 A1 Nov. 19, 2020

(30) Foreign Application Priority Data
Sep. 19, 2017 (KR) .................. 10-2017-0120308

(51) Int. Cl.
*H02P 21/00* (2016.01)
*H02P 21/22* (2016.01)
(Continued)

(52) U.S. Cl.
CPC ............. *H02P 21/22* (2016.02); *H02P 6/10* (2013.01); *H02P 6/183* (2013.01); *H02P 21/18* (2016.02); *H02P 21/20* (2016.02); *H02P 27/06* (2013.01)

(58) Field of Classification Search
CPC .......... H02P 21/22; H02P 21/18; H02P 21/20; H02P 6/10
(Continued)

(56) References Cited

U.S. PATENT DOCUMENTS 5,886,498 A 3/1999 Sul et al.
6,801,011 B2 * 10/2004 Ide .................... H02P 6/185
318/609

(Continued)

FOREIGN PATENT DOCUMENTS

JP 2008-301695 A 12/2008
JP 2015-136237 A 7/2015
(Continued)

OTHER PUBLICATIONS

PCT International Search Report, PCT/KR2018/011071, dated Jan. 2, 2019, 4 Pages.
(Continued)

*Primary Examiner* — Erick D Glass
(74) *Attorney, Agent, or Firm* — Fenwick & West LLP

(57) ABSTRACT

A motor control apparatus according to one embodiment of the present invention comprises: a current controller for generating a voltage command signal on the basis of a torque command for driving a motor and a fundamental wave current of the motor; a high frequency voltage generator for generating a high frequency voltage signal for injection into the voltage command signal; an inverter for applying a voltage to the motor on the basis of the voltage command signal and the high frequency voltage signal; an angle estimator for generating an estimated angle of a rotor of the motor on an estimated coordinate system on the basis of a current signal of the motor; and a compensator for adding a first compensation signal ($i_{comp}$) to the current signal ($i_{sig}$),
(Continued)

wherein the first compensation signal ($i_{comp}$) may be related to the torque command and the estimated angle.

15 Claims, 35 Drawing Sheets

(51) Int. Cl.
*H02P 21/18* (2016.01)
*H02P 21/20* (2016.01)
*H02P 6/10* (2006.01)
*H02P 6/18* (2016.01)
*H02P 27/06* (2006.01)

(58) Field of Classification Search
USPC .................................................. 318/400.02
See application file for complete search history.

(56) References Cited

U.S. PATENT DOCUMENTS

| | | | | |
|---|---|---|---|---|
| 7,045,988 B2* | 5/2006 | Ha | ........................ | H02P 21/04 |
| | | | | 318/807 |
| 8,154,231 B2* | 4/2012 | Komatsu | ................ | H02P 21/18 |
| | | | | 318/400.06 |
| 8,330,402 B2 | 12/2012 | Ide et al. | | |
| 9,948,224 B1* | 4/2018 | Huh | ........................ | H02P 21/26 |
| 2014/0225548 A1* | 8/2014 | Xu | ........................ | H02P 21/13 |
| | | | | 318/400.33 |
| 2015/0207446 A1 | 7/2015 | Kakihara et al. | | |

FOREIGN PATENT DOCUMENTS

| | | |
|---|---|---|
| KR | 10-0877599 B1 | 1/2009 |
| KR | 10-2011-0112995 A | 10/2011 |
| KR | 10-1450481 B1 | 10/2014 |
| KR | 10-1654826 B1 | 9/2016 |
| WO | WO 2008/146996 A1 | 12/2008 |

OTHER PUBLICATIONS

Bianchi, N., et al., "Influence of Rotor Geometry of an IPM Motor on Sensorless Control Feasibility," IEEE Transactions on Industry Applications, 2007, pp. 87-96, vol. 43, No. 1.

Zhu, Z. Q., et al., "Compensation for Rotor Position Estimation Error due to Cross-Coupling Magnetic Saturation in Signal Injection Based Sensorless Control of PM Brushless AC Motors," IEEE International Electric Machines & Drives Conference (IEMDC), 2007, pp. 208-213.

* cited by examiner

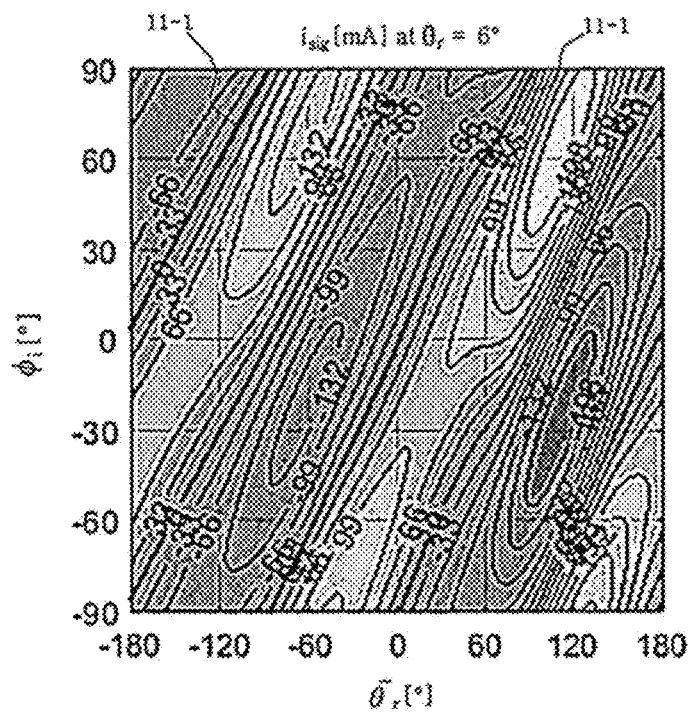

ized cross-coupling magnetic saturation in signal injection based sensorless control of PM brushless AC motors," in Proc. Int. Elect. Mach. Drives Conf. (IEMDC), May 2007, pp. 208213.) is used.

MOTOR CONTROL APPARATUS

TECHNICAL FIELD

This disclosure relates to a motor control apparatus, and more particularly, to a position-sensorless motor control apparatus for compensating a current signal and changing an angle at which a high frequency voltage signal is injected.

BACKGROUND ART

In general, various industrial equipment includes a motor to generate a driving force. The motor senses a current supplied, the number of rotations of a rotary shaft, or the like and adjust a torque generated by compensating or controlling the same. For example, in an AC motor that is a type of motor, the motor may be controlled by flowing an AC current through a stator. For the generation of AC current, frequency and phase reference is required. The reference relates to position information or speed information of a rotor. Thus, in order to obtain accurate position information of the motor rotor, a sensor such as a resolver and an encoder should be attached to a rotor shaft of the motor. However, the sensor such as a resolver and an encoder is generally expensive and has a disadvantage since complicated hardware must be separately attached to a control circuit. In addition, the sensors are limited in use environments because the sensors are greatly affected by the surrounding environment such as vibration and humidity. Also, since the sensor is attached to the rotary shaft of the motor, additional problems such as the increase of motor size also occur.

In order to avoid the above problems, a sensorless motor capable of controlling to generate a desired torque by using each parameter value of the motor without using a sensor for checking a position of the motor rotor has been widely used. In particular, when the motor is stopped or operated at a low speed, a position information estimating technology through signal injection is widely used.

FIG. 1 shows a signal measured by a conventional sensorless motor to estimate position information of a rotor. Referring to FIG. 1, as a specific high frequency signal voltage is applied from an estimated synchronous coordinate system of a motor, a current having the same frequency as the voltage applied to a dq-axis on the estimated synchronous coordinate system appears at the motor stator. The magnitude of the current in the estimated coordinate system has an ellipse form. Conventionally, a position θ of the rotor is estimated by comparing a long axis and a short axis of the elliptic current.

FIG. 2 is a diagram showing a motor current trajectory with respect to a specific high frequency applying voltage according to each driving point. Referring to FIG. 2, if the motor is magnetically saturated as a load current increases, the inductance changes at the corresponding driving point, thereby changing the form of the current trajectory. For example, if $L_{dqh}=0$ and $\Delta L=(L_d-L_q)/2=0$ (21), the current trajectory becomes circular, making it impossible to estimate the rotor position by comparing the magnitudes of current in the long axis and the short axis. In addition, even if the current trajectory is not circular, a great angular error is generated when the difference between the long axis and the short axis is small in the elliptic current.

As described above, the following method is used to solve the angular error generated when a sensorless motor is operated due to magnetic saturation in a high torque region of the motor.

For example, a method of adding a compensation value to the output of an angle estimator by using the fact that the angular error caused by $L_{dqh}$ is proportional to a q-axis current (1: Z. Q. Zhu, Y. Li, D. Howe, and C. M. Bingham, "Compensation for rotor position estimation error due to cross-coupling magnetic saturation in signal injection based sensorless control of PM brushless AC motors," in Proc. Int. Elect. Mach. Drives Conf. (IEMDC), May 2007, pp. 208213.) is used.

However, even in the conventional method, it is not possible to solve that estimation is unable according to the increase of current, and there is a problem that an angular error still occurs between an estimated rotor position (angle) and an actual rotor position.

DISCLOSURE

Technical Problem

This disclosure is directed to accurately estimate and control the rotor position even in the high torque range by correcting the magnitude or shape of a signal input to an angle estimator in consideration of the phenomenon that the inductance is changed depending on a driving point.

Technical Solution

A motor control apparatus according to an embodiment of the present disclosure comprises: a current controller for generating a voltage command signal on the basis of a torque command for driving a motor and a fundamental wave current of the motor; a high frequency voltage generator for generating a high frequency voltage signal for injecting into the voltage command signal; an inverter for applying a voltage to the motor on the basis of the voltage command signal and the high frequency voltage signal; an angle estimator for generating an estimated angle of a rotor of the motor on an estimated coordinate system on the basis of a current signal of the motor; and a compensator for adding a first compensation signal ($i_{comp}$) to the current signal ($i_{sig}$), wherein the first compensation signal ($i_{comp}$) is related to the torque command and the estimated angle.

In a preferred embodiment, the current signal ($i_{sig}$) may be obtained by extracting a signal corresponding to a frequency of the high frequency voltage signal from the motor current, and the current signal ($i_{sig}$) may be an estimated q-axis component of the estimated coordinate system.

In a preferred embodiment, the angle estimator may generate the estimated angle of the rotor of the motor on the basis of a first compensation current signal ($i_{sig}'$) that is the sum of the current signal and the first compensation signal, the current signal ($i_{sig}$) may be a function of the torque command, a position of the rotor of the motor and a first angular error, and the first angular error may be a difference between the estimated angle and the position of the rotor, and the first compensation signal may be expressed by the following equation:

first compensation signal ($i_{comp}$)=(−1)*current signal ($i_{sig}$), where first angular error=0°.

In a preferred embodiment, the motor control apparatus may further comprise a reference table storing unit for storing a corresponding relationship reference table of the position of the rotor of the motor and the torque command.

In a preferred embodiment, the compensator may generate the first compensation signal on the basis of the corresponding relationship reference table stored in the reference table storing unit and a present torque command.

In a preferred embodiment, the motor control apparatus may further comprise a first coordinate converter and second coordinate converter, the first coordinate converter may perform reference coordinate transformation to the sum of the voltage command signal and the high frequency voltage signal on the basis of the estimated angle from an estimated synchronous coordinate system to a stationary coordinate system, and the second coordinate converter may perform reference coordinate transformation to the fundamental wave current on the basis of the estimated angle from a stationary coordinate system to an estimated synchronous coordinate system.

In a preferred embodiment, the high frequency voltage generator may generate the high frequency voltage signal in an estimated d-axis on the estimated coordinate system, and the current signal of the motor may be an estimated q-axis component on the estimated coordinate system.

In a preferred embodiment, the fundamental wave current input to the current controller may be an estimated d-axis component and an estimated q-axis component on the estimated coordinate system.

In a preferred embodiment, the high frequency voltage generator may generate the high frequency voltage signal in an injected d-axis of an injection coordinate system that is rotated from the estimated coordinate system by an injection angle.

In a preferred embodiment, the current signal may be an injected q-axis component on the injection coordinate system.

In a preferred embodiment, the current signal may be expressed as a function of the torque command, a position of the rotor, the injection angle and a second angular error, and the second angular error may be a difference between the injection angle and the position of the rotor.

In a preferred embodiment, the motor control apparatus may further comprise a compensator for adding a second compensation signal ($i_{comp}'$) to the current signal ($i_{sig}$), the angle estimator may generate an estimated angle of the rotor of the motor on the basis of a compensation current signal ($i_{sig}''$) that is the sum of the current signal and the second compensation signal, and the second compensation signal may be expressed by the following equation:

second compensation signal ($i_{comp}'$)=(−1)*current signal ($i_{sig}$), where first angular error=0°.

In a preferred embodiment, the injected d-axis may be ahead of an estimated d-axis by the injection angle.

In a preferred embodiment, the motor control apparatus may further comprise a reference table storing unit for storing a corresponding relationship reference table of the torque command according to the position of the rotor of the motor and the injection angle.

In a preferred embodiment, the compensator may generate a second compensation signal on the basis of the corresponding relationship reference table stored in the reference table storing unit and a present torque command.

In a preferred embodiment, the injection angle may be determined within a range in which a first angular error is 0 and a second compensation current signal becomes 0 while having a positive slope on the basis of the first angular error.

Advantageous Effects

According to an aspect of the present disclosure, a position of a rotor of a motor may be accurately estimated for any driving point by adding a compensation value to a current signal input to an angle estimator and using an axis (an injection axis) for injecting a high frequency voltage and detecting a current ripple and an axis (an estimation axis) for estimating the position of the rotor together.

DESCRIPTION OF DRAWINGS

FIGS. 11A to 11J show a current signal $i_{sig}(T_e^*, \tilde{\theta}_r, \theta_r, \phi_i)$ according to the first angular error ($\tilde{\theta}_r$) and the injection angle ($\phi_i$) when the torque command has a predetermined value (1 pu) according to an embodiment of the present disclosure.

FIGS. 12A to 12J show a second compensation current signal ($i_{sig}''$) where a second compensation signal ($i_{comp}'$) is applied to the current signal ($i_{sig}$) depicted in FIGS. 11A to 11J according to an embodiment of the present disclosure.

BEST MODE

Figure 1:
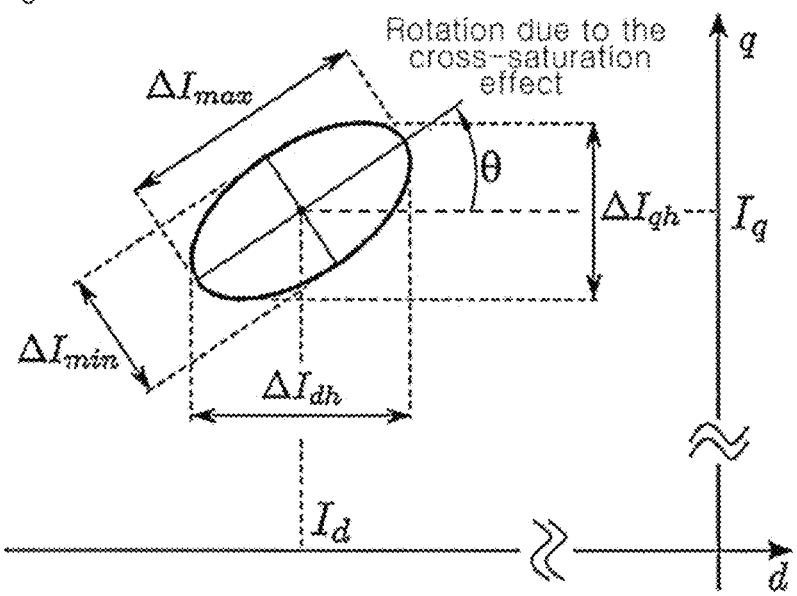
FIG. 1 shows a signal measured by a conventional sensorless motor to estimate position information of a rotor.
Figure 2:
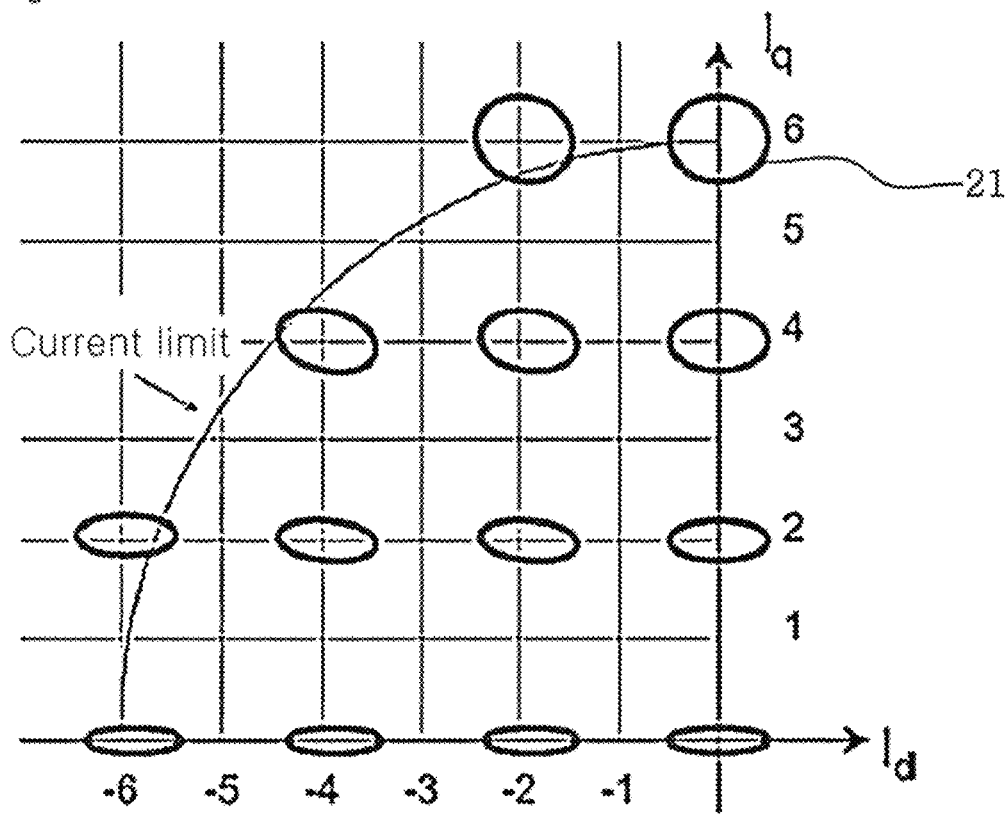
FIG. 2 is a diagram showing a motor current trajectory with respect to a specific high frequency applying voltage according to each driving point.

The present disclosure will be described below with reference to the accompanying drawings that show, by way of illustration, specific embodiments in which the present disclosure may be implemented. The embodiments are described fully to enable those skilled in the art to implement the present disclosure. It should be understood that the various embodiments of the present disclosure are different from each other but need not be mutually exclusive. For example, certain shapes, structures and characteristics of one embodiment described herein may be realized in other embodiments without departing from the scope of the present disclosure.

In addition, it should be understood that the positions or arrangements of individual components in each disclosed embodiment may be changed without departing from the scope of the present disclosure. Accordingly, the following detailed description is not to limit the scope of the present disclosure, and if properly described, the scope of the present disclosure is defined only by the appended claims along with the full range of equivalents to which the claims are entitled. Similar reference numerals in the drawings refer to the same or similar functions throughout the several aspects.

Prior to description, a current and voltage expressed by dq will be explained briefly. The voltage and current used to drive an AC motor are AC components. The current passing through a three-phase stator winding is an AC current that is identical or similar to a rotation frequency of a motor. The phases have a phase difference of 120 degrees from each other and are expressed as UVW or RST in the phase order. By using the concept of a complex space vector, the current component may be expressed as a vector. In the vector theory, a specific vector existing on a plane may be expressed as the sum of two reference vectors. Using this principle, the UVW three-phase currents are commonly expressed using dq-based current vectors with a phase difference of 90 degrees from each other.

In general, a sensorless angle estimation method for injecting a high frequency voltage injects a high frequency voltage (for example, a square wave) to an estimated d-axis on an estimated coordinate system and detects an estimated q-axis current ripple to estimate a position (angle) of a rotor. At this time, the estimated q-axis current ripple is as show in Equation 1 below. If the estimated q-axis current ripple is divided by a clock signal (a square wave signal, clk, whose magnitude is alternating to +1 and −1), a current signal ($i_{sig}$) input to an angle estimator is expressed as in Equation 2 below.

$$\Delta i_{qsh}^{\hat{r}}[n] = I_\Delta \cdot \sin(2\tilde{\theta}_r - 2\phi_\Delta) \cdot clk[n-2], \quad \text{[Equation 1]}$$

$$\text{where } I_\Delta = \frac{V_h T_s \sqrt{L_{dqh}^2 + \Delta L_h^2}}{L_{dh} L_{qh} - L_{dqh}^2}, \; \phi_\Delta = \frac{1}{2}\text{atan}(L_{dqh}, -\Delta L_h)$$

$$i_{sig} = 1/clk[n-2] \cdot \Delta i_{qsh}^{\hat{r}}[n] = I_\Delta \cdot \sin(2\tilde{\theta}_r - 2\phi_\Delta) \quad \text{[Equation 2]}$$

In Equations 1 and 2, the angular error ($\tilde{\theta}_r$) is a difference of a position ($\theta_r$) of the rotor and an estimated position (an estimated angle, $\hat{\theta}_r$) of the rotor and may be defined as in Equation 3 below.

$$\tilde{\theta}_r = \theta_r - \hat{\theta}_r \quad \text{[Equation 3]}$$

Meanwhile, it is conventionally known that $I_\Delta$ and $\phi_\Delta$ are not changed depending on an angular error ($\tilde{\theta}_r$). Thus, the current signal ($i_{sig}$) is known as being in the form of a sine wave with respect to the angular error. In addition, an angle estimator (or, an observer) is known as operating such that the input current signal ($i_{sig}$) is converged to a zero up-crossing point at which a negative number changes into a positive number to estimate a rotor position. Thus, it is known that the angular error is converged to $\phi_\Delta$ in a normal state.

However, unlike the conventional technique known in the art, during an actual sensorless operation, a current driving current changes according to an angular error, and also a motor inductance changes according to the current driving point and the rotor position.

Figure 3:
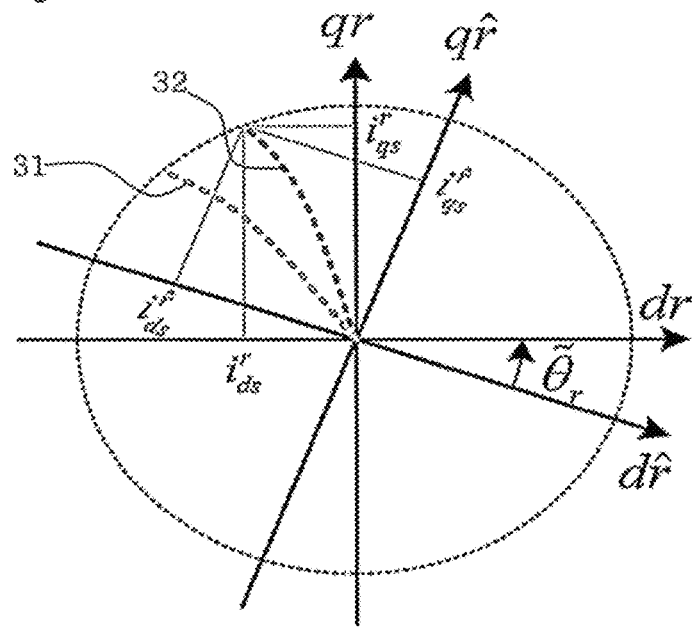
FIG. 3 is a diagram for illustrating that a current driving point is changed according to an angular error ($\tilde{\theta}_r$).

FIG. 3 is a diagram for illustrating that a current driving point is changed according to an angular error ($\tilde{\theta}_r$). Assuming that the motor operates with a maximum torque per ampere (MTPA), the current driving point is determined by a torque command. In FIG. 3, a dotted line 31 shows a MTPA curve on a (dr, qr) current plane of a synchronous coordinate system. In this case, the current driving point of any torque command is determined as a point on the dotted line 31.

However, since the current is controlled on the basis of the estimated coordinate system (d̂r̂, q̂r̂) during the sensorless operation, if an angular error occurs, the driving point is moved by the angular error ($\tilde{\theta}_r$). Thus, the driving point of the torque on the MTPA curve 31 intended by a user is changed to a driving point on another curve 32.

Figure 4A:
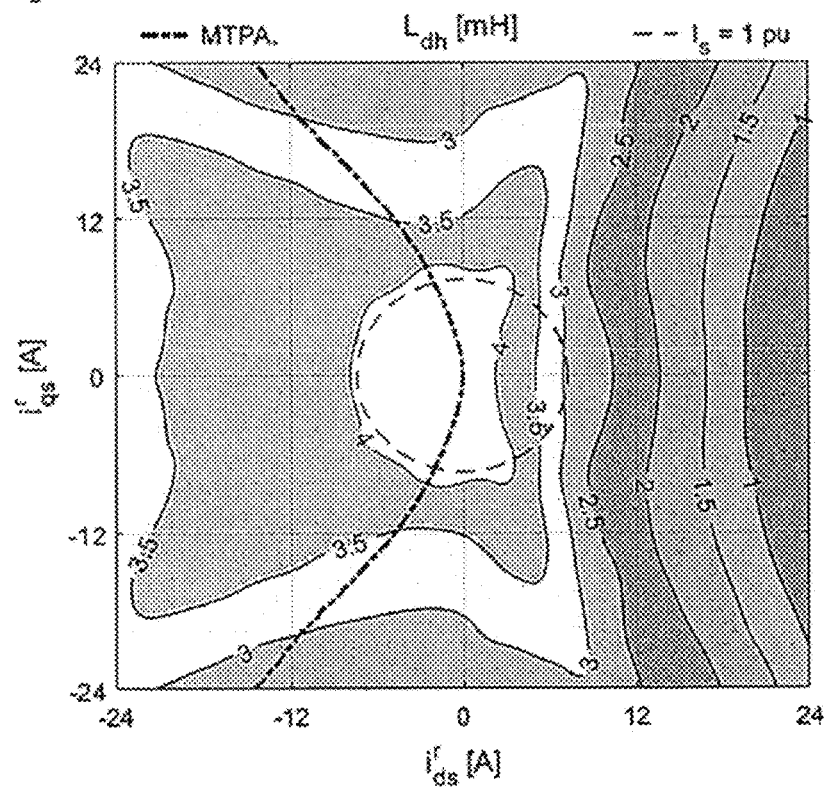
FIGS. 4A to 4C show inductance according to the driving point when the position ($\theta_r$) of the rotor is fixed to 0°.
Figure 4B:
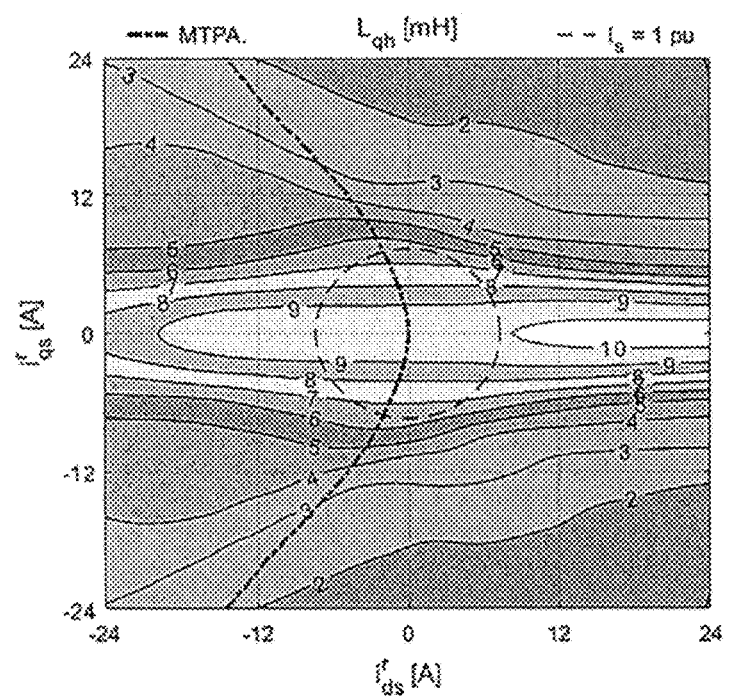
Figure 4C:
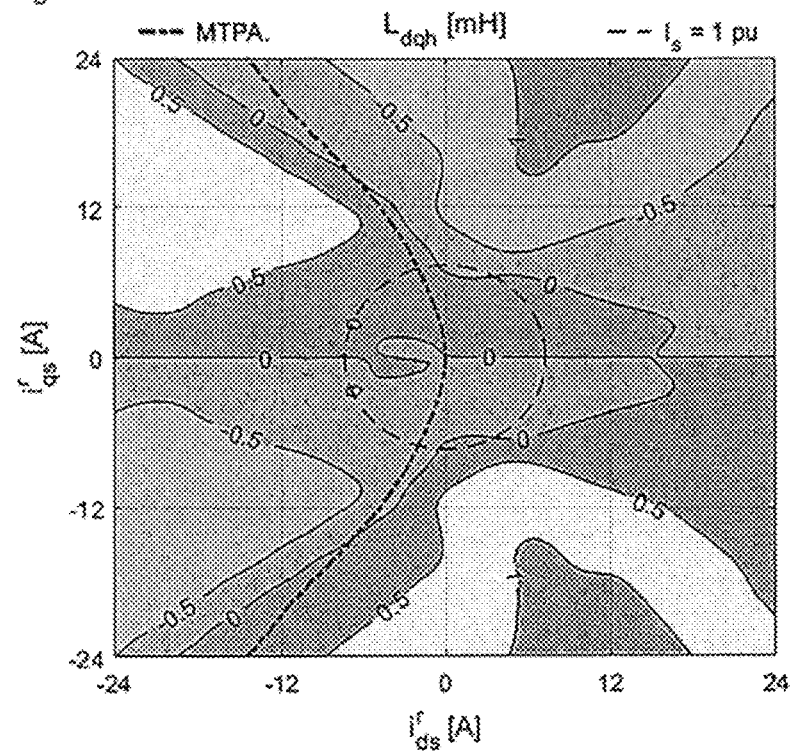
Figure 5A:
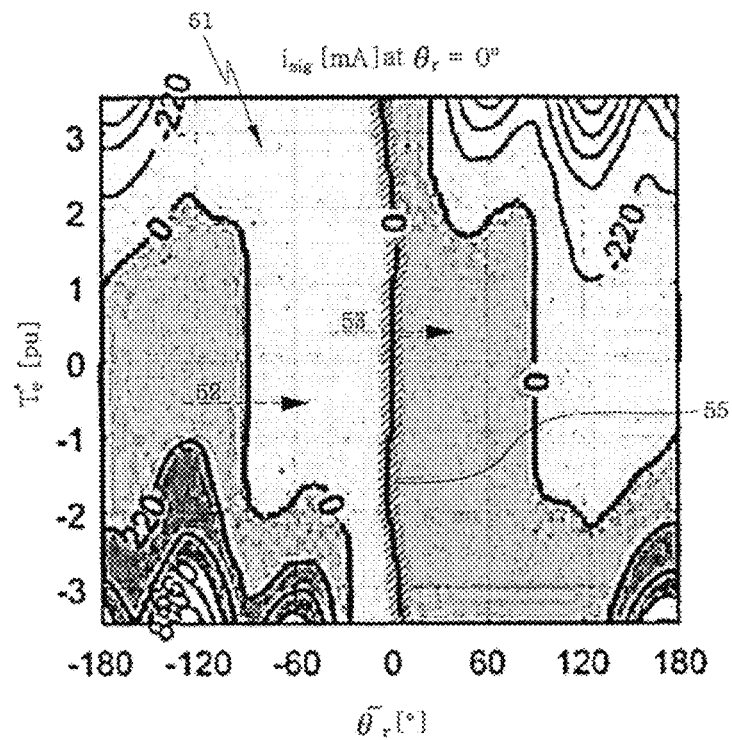
FIGS. 5A to 5J show a current signal ($i_{sig}$) according to a torque command and an angular error at a specific rotor position.
Figure 5B:
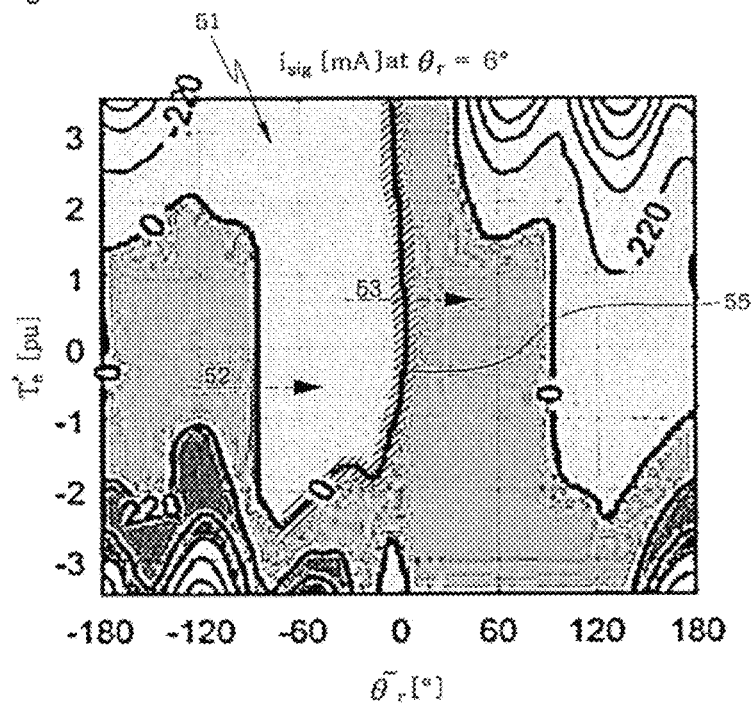
Figure 5C:
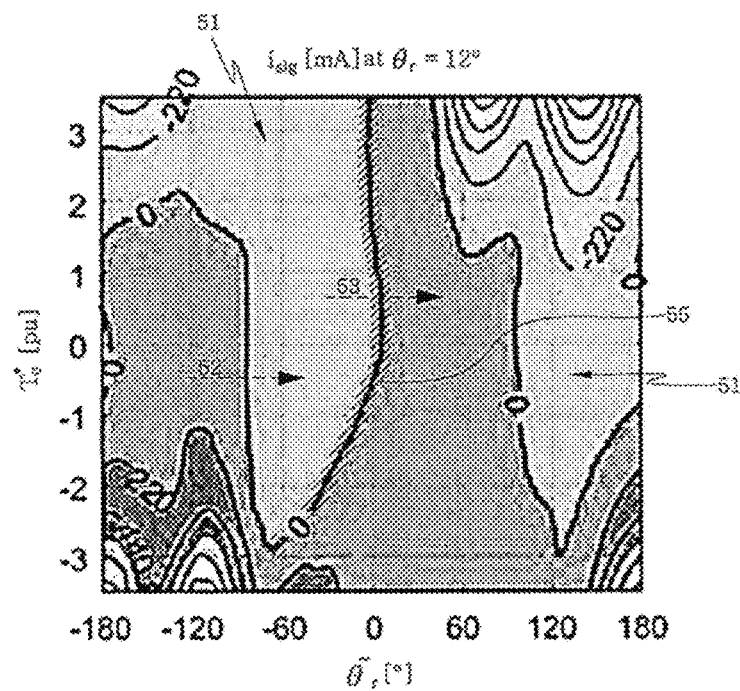
Figure 5D:
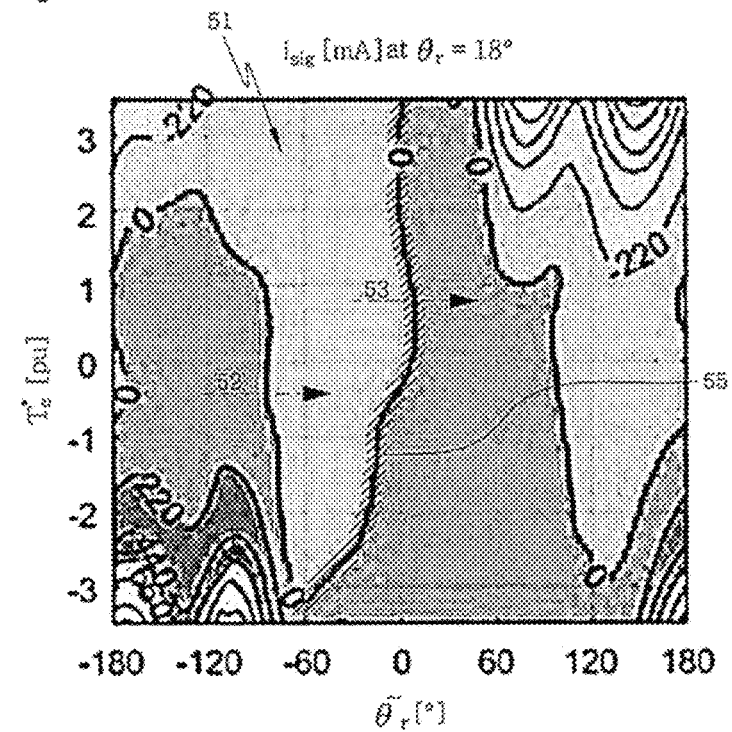
Figure 5:
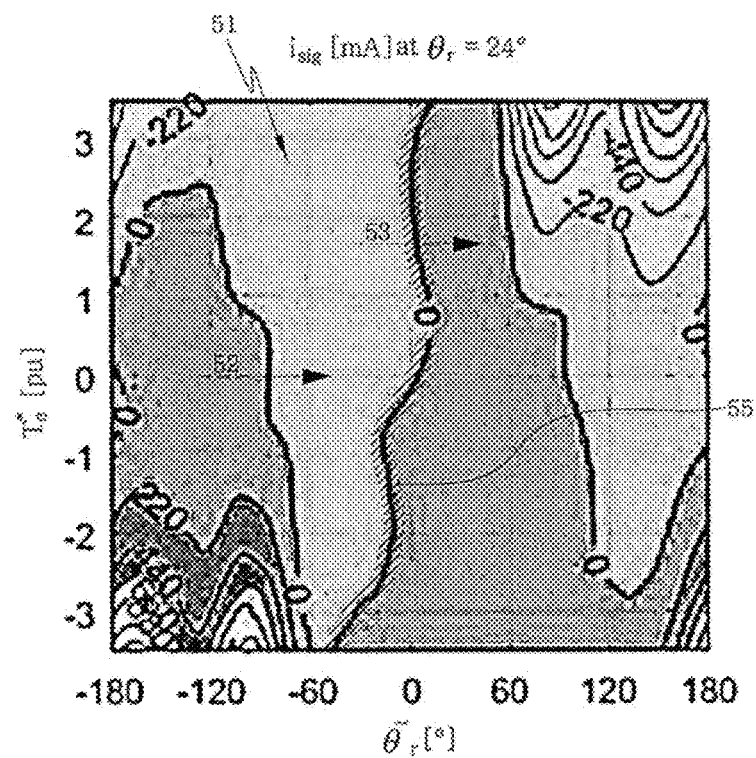
Figure 5:
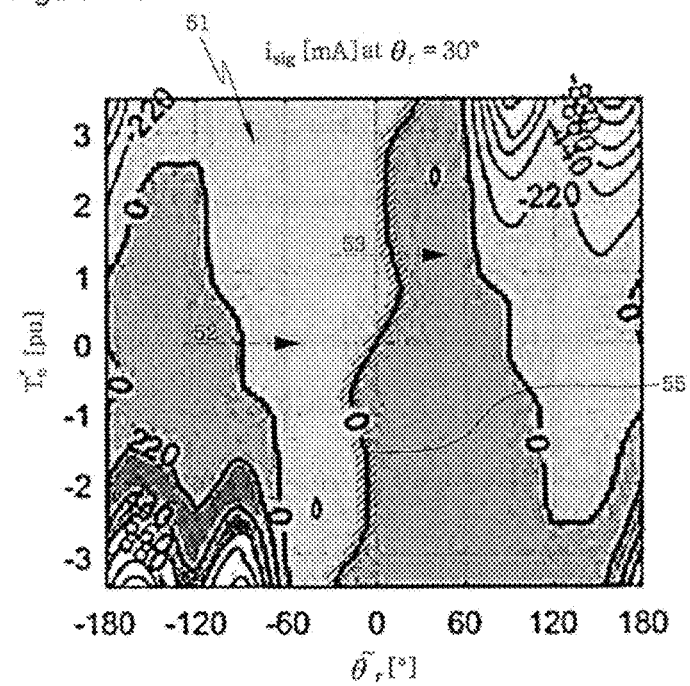
Figure 5G:
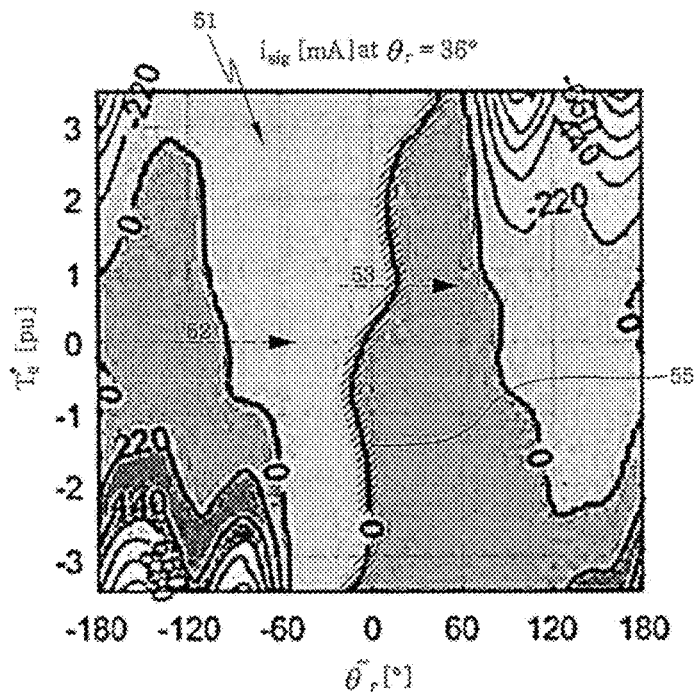
Figure 5H:
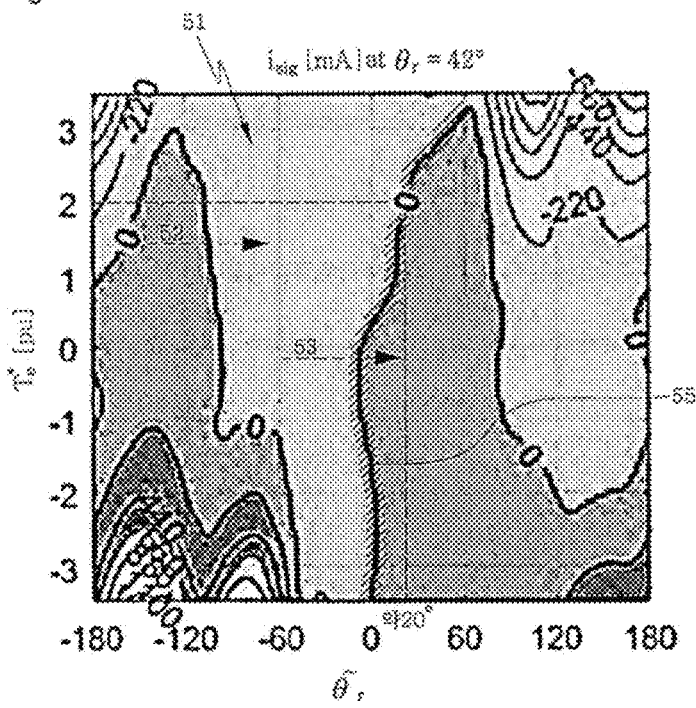
Figure 5I:
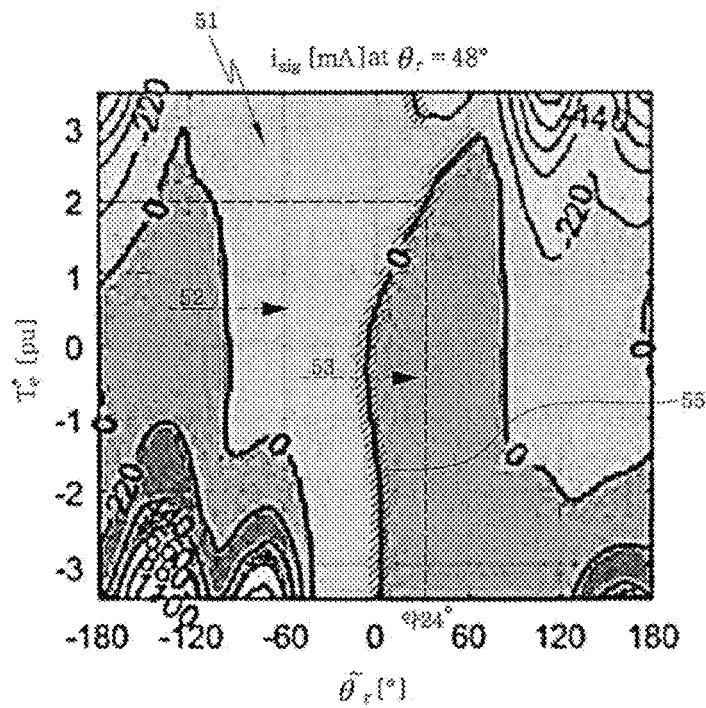
Figure 5J:
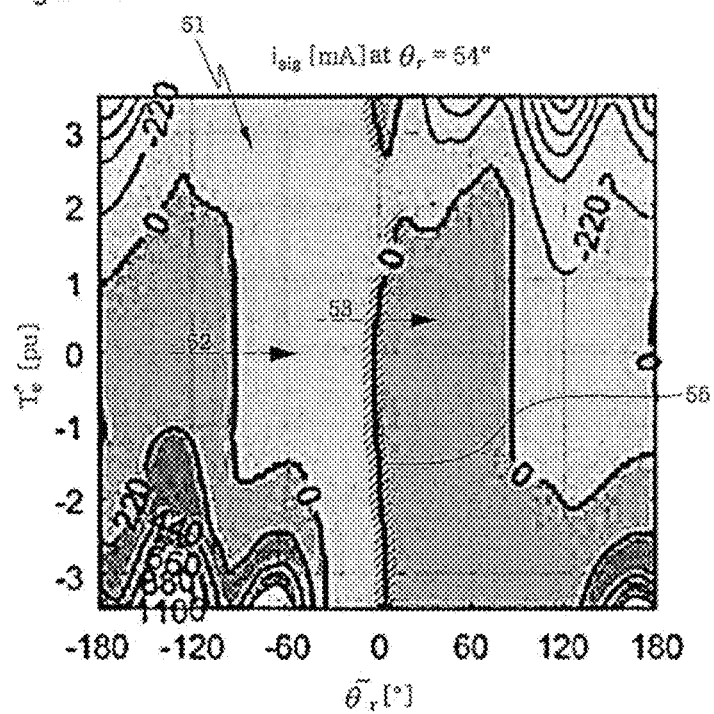

FIG. 4A to FIG. 4C show inductance according to the driving point when the position ($\theta_r$) of the rotor is fixed to 0°. FIGS. 4A to 4C show simulation results obtained by finite element analysis (FEA) for a 8-pole 12-slot motor manufactured by Kommotec Co., Ltd, which is however used just for explaining the magnetic flux and inductance change according to the driving point, and the content of the present disclosure is not limited to the structure or features of this product.

Referring to FIGS. 4A to 4C, it may be found that the inductance changes nonlinearly depending on the driving point. Since 6 harmonics are present in the inductance, if the rotor position is changed, the waveform of FIGS. 4A to 4C is also changed.

As described above, the current driving point is affected by not only the torque command but also 1) the angular error and 2) the rotor position, so it is required to estimate and control the motor angle in consideration of the same.

For this purpose, the motor inductance must be expressed as a function of the torque command, the angular error and the rotor position. If the motor inductance is expressed as a function of the torque command, the angular error and the rotor position, the current signals of Equations 1 and 2 may be expressed as in Equations 4 and 5 below, respectively.

$$\Delta i_{qsh}^{\hat{r}}[n] = I_\Delta \cdot \sin(2\tilde{\theta}_r - 2\phi_\Delta) \cdot clk[n-2], \quad \text{[Equation 4]}$$

$$\text{where } I_\Delta =$$

$$\frac{V_h T_s \sqrt{L_{dqh}(T_e^*, \tilde{\theta}_r, \theta_r)^2 + \Delta L_h(T_e^*, \tilde{\theta}_r, \theta_r)^9}}{L_{dh}(T_e^*, \tilde{\theta}_r, \theta_r) L_{qh}(T_e^*, \tilde{\theta}_r, \theta_r) - L_{dqh}(T_e^*, \tilde{\theta}_r, \theta_r)^2} \text{ and}$$

$$\phi_\Delta = \frac{1}{2}\text{atan}(L_{dqh}(T_e^*, \tilde{\theta}_r, \theta_r), -\Delta L_h(T_e^*, \tilde{\theta}_r, \theta_r))$$

$$i_{sig} = 1/clk[n-2] \cdot \Delta i_{qsh}^{\hat{r}}[n] = \quad \text{[Equation 5]}$$
$$I_\Delta(T_e^*, \tilde{\theta}_r, \theta_r) \cdot \sin(2\tilde{\theta}_r - 2\phi_\Delta(T_e^*, \tilde{\theta}_r, \theta_r))$$

Seeing Equations 4 and 5, since $I_\Delta$ and $\phi_\Delta$ are also functions of an angular error, the current signal ($i_{sig}$) does not have a sine wave characteristic with respect to the angular error any more. In other words, if the x-axis is represented as an angular error and the y-axis is represented as a current signal ($i_{sig}$), the current signal ($i_{sig}$) does not have a sine wave form.

FIGS. 5A to 5J show a current signal ($i_{sig}$) according to a torque command and an angular error at a specific rotor position. Referring to FIGS. 5A to 5J, it may be found that the current signal ($i_{sig}$) does not have a sine wave characteristic with respect to the angular error and changes in an atypical form.

Referring to FIGS. 5A to 5J, a region 51 shows a portion where the current signal ($i_{sig}$) has a negative number. Thus, in FIGS. 5A to 5J, arrows 52, 53 represent zero crossing points at which the sign of the current signal ($i_{sig}$) is changed. More specifically, the arrow 52 shows that as the angular error ($\tilde{\theta}_r$) increases, the current signal ($i_{sig}$) passes the point of 0 (A) while changing from a positive number to a negative number, and the arrow 53 shows that as the angular error ($\tilde{\theta}_r$) increases, the current signal ($i_{sig}$) passes the point of 0 (A) while changing from a negative number to a positive number. For convenience of explanation, in this specification, passing 0 while changing from a positive number to a negative number as in the arrow 52 is referred to as zero down-crossing, and passing 0 while changing from a negative number to a positive number as in the arrow 53 is referred to as zero up-crossing.

Since the angle estimator converges the estimated angle to the point where the current signal ($i_{sig}$) makes zero up-crossing as described above, in FIGS. 5A to 5J, a hatched region 55 may be regarded as a convergence point of the angle estimator. For example, referring to FIGS. 5H and 5J, when the torque command is 2 pu, it may be found that the angular error is about 20° and about 24°. Seeing these results, it may be found that the angular error is different for the same torque command depending on the rotor position. Thus, a method of estimating an angle of the rotor in consideration of the rotor position and the angular error changing according to the rotor position is demanded.

First Embodiment (Compensation of the Current Signal)

Figure 6:
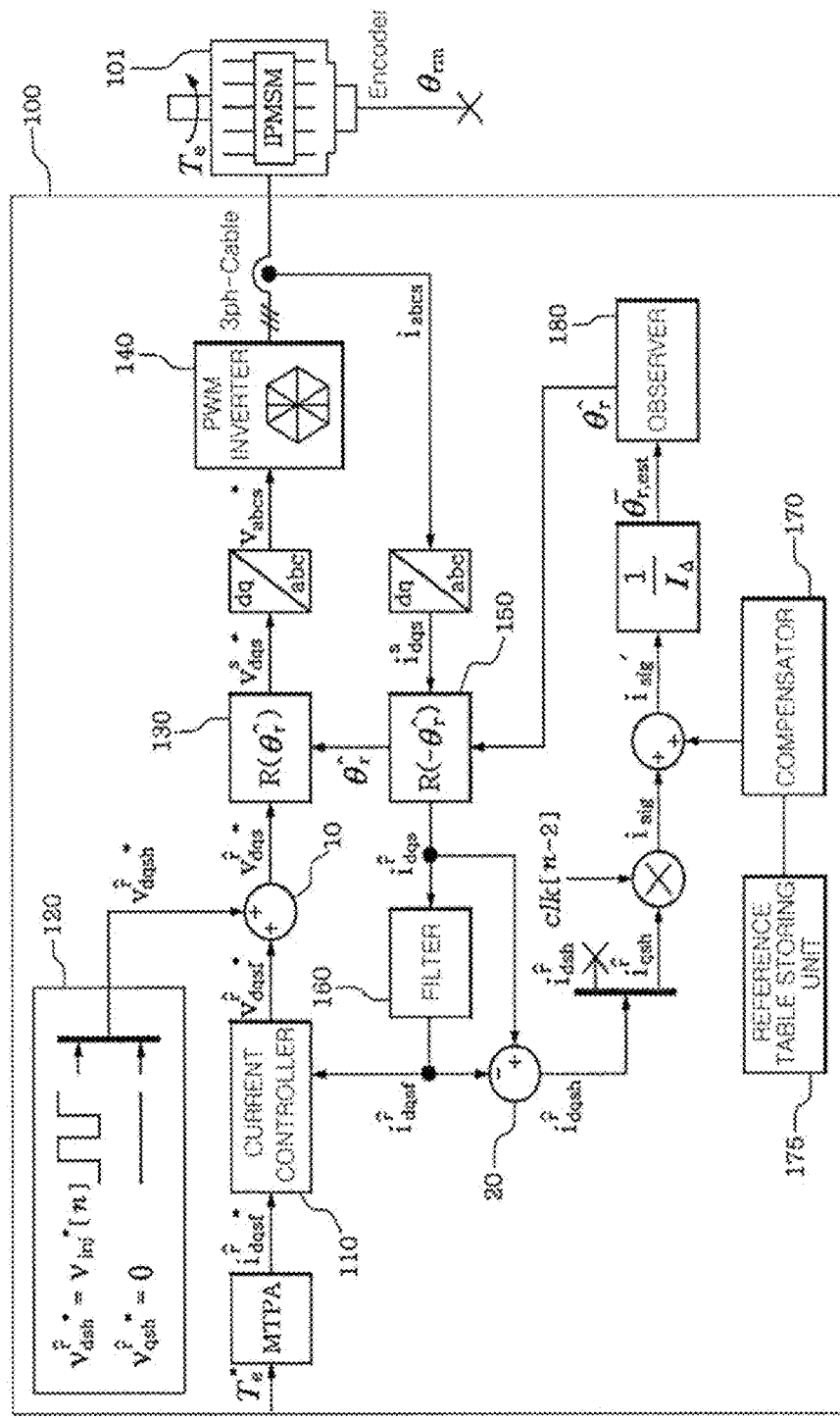
FIG. 6 is a block diagram showing a motor control apparatus 100 according to an embodiment of the present disclosure.
Figure 7A:
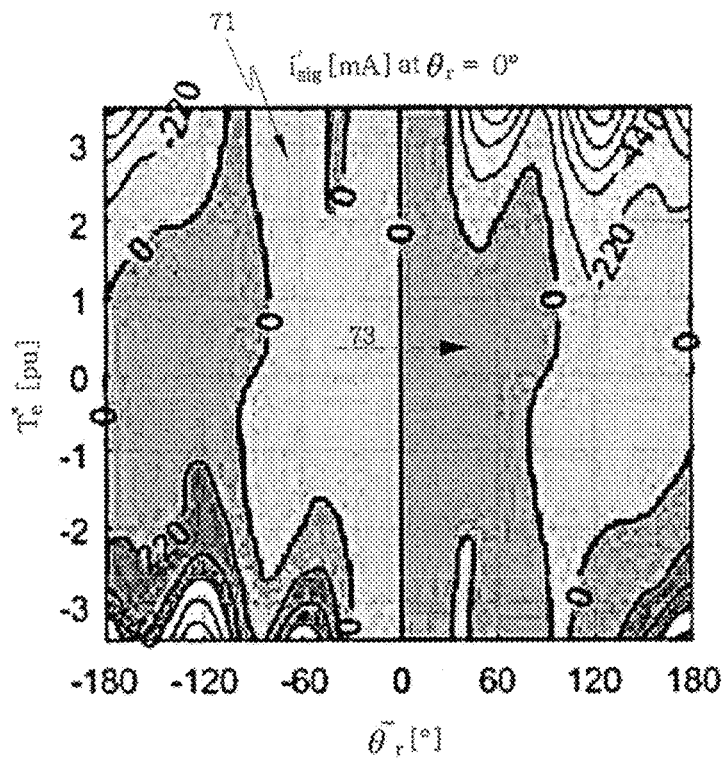
FIGS. 7A to 7J show a first compensation current signal ($i_{sig}'$) according to the torque command and the angular error at various rotor positions.
Figure 7B:
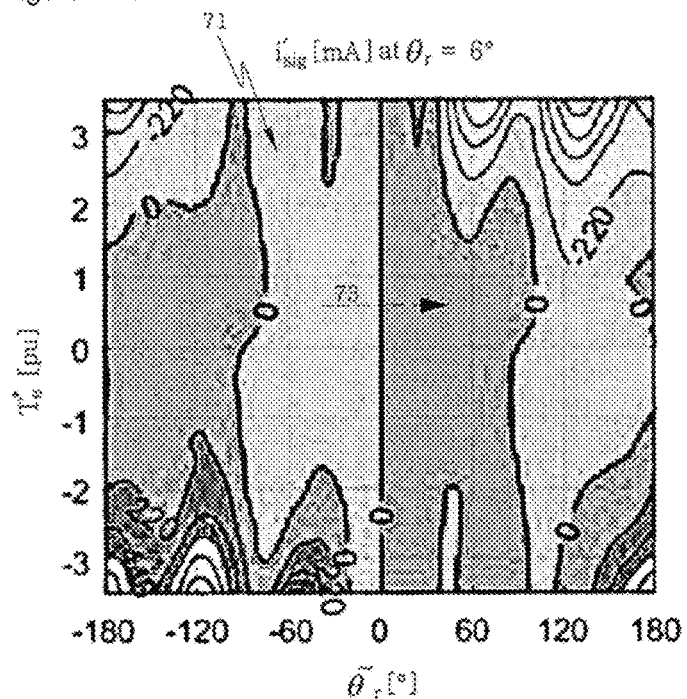
Figure 7:
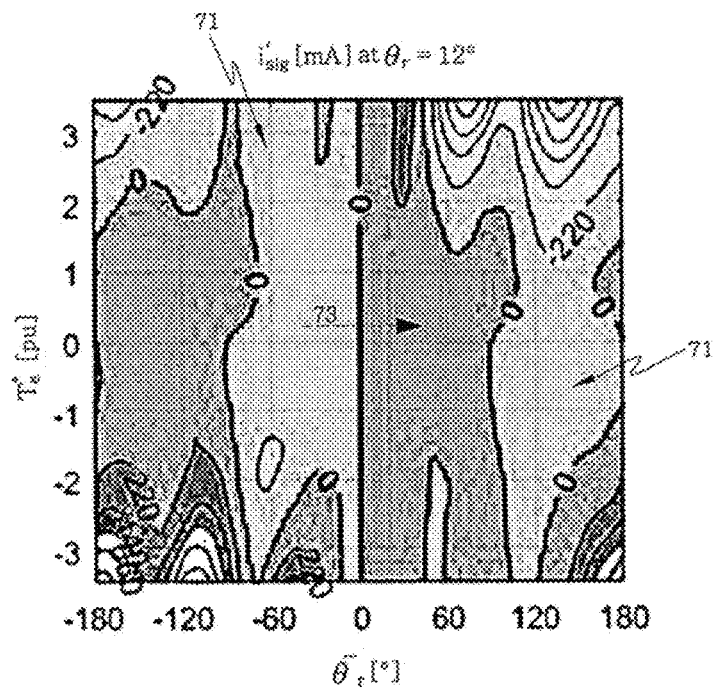
Figure 7:
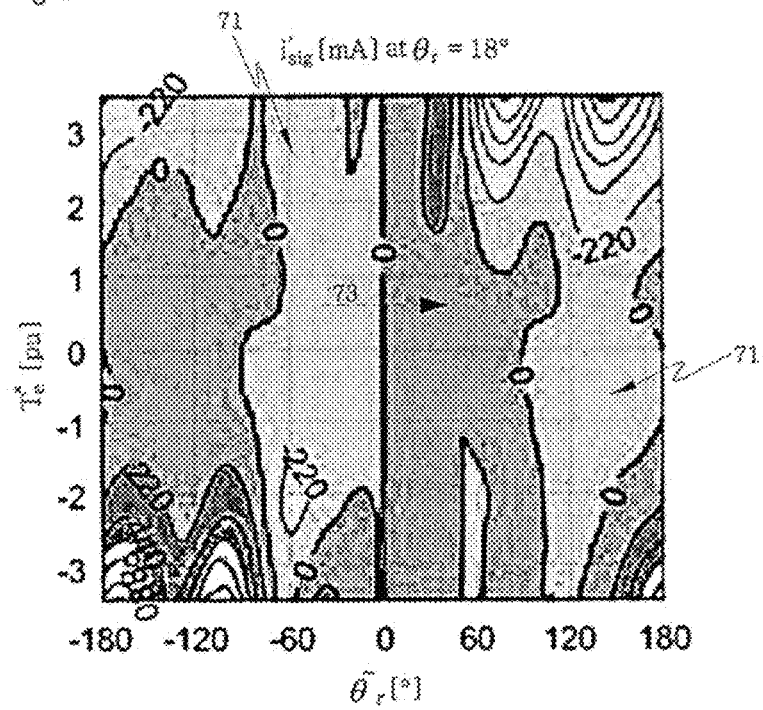
Figure 7E:
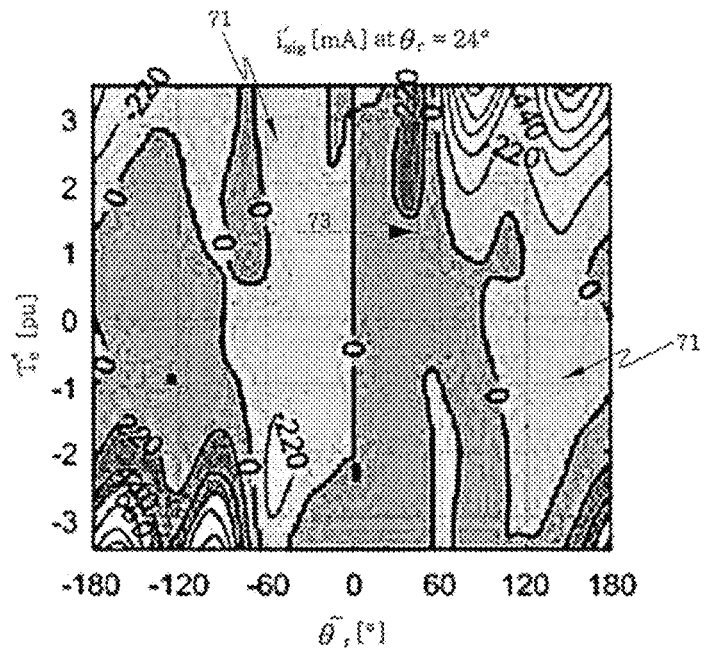
Figure 7F:
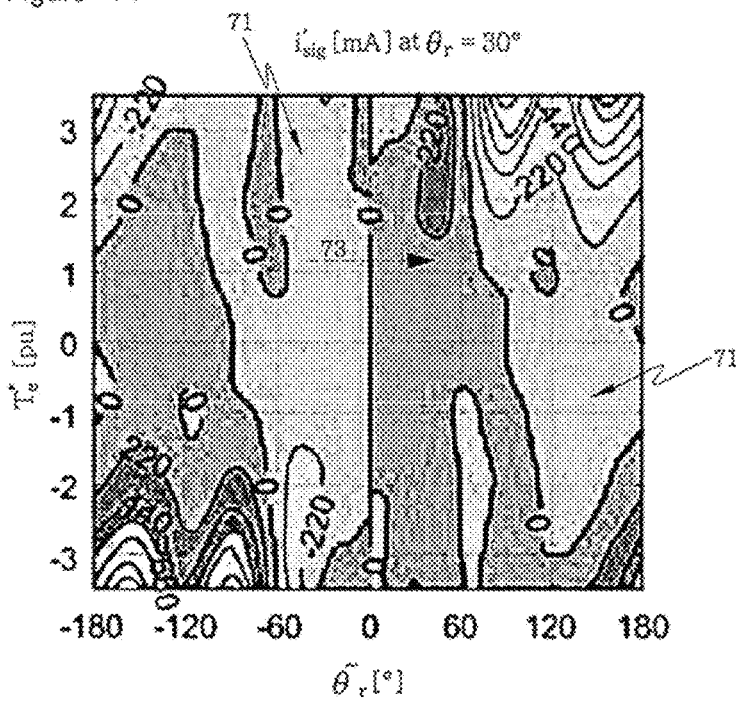
Figure 7G:
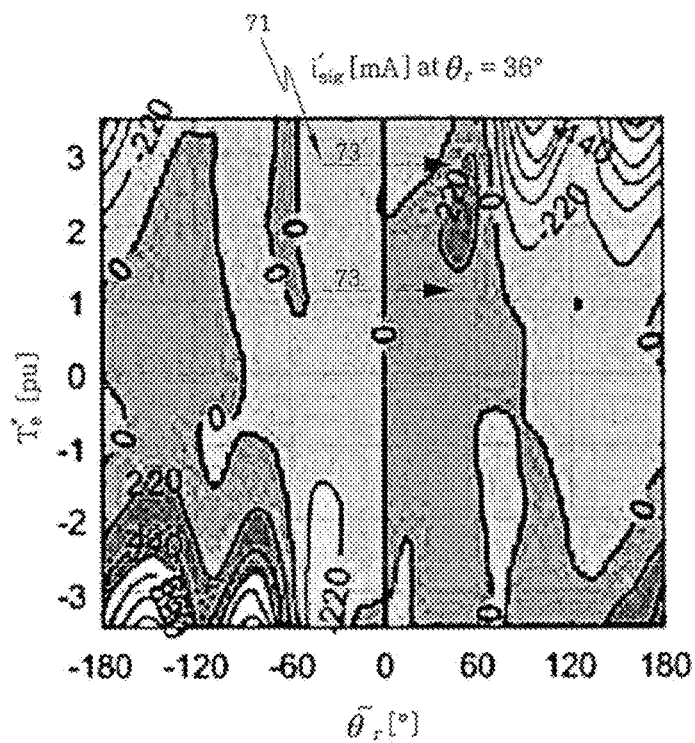
Figure 7H:
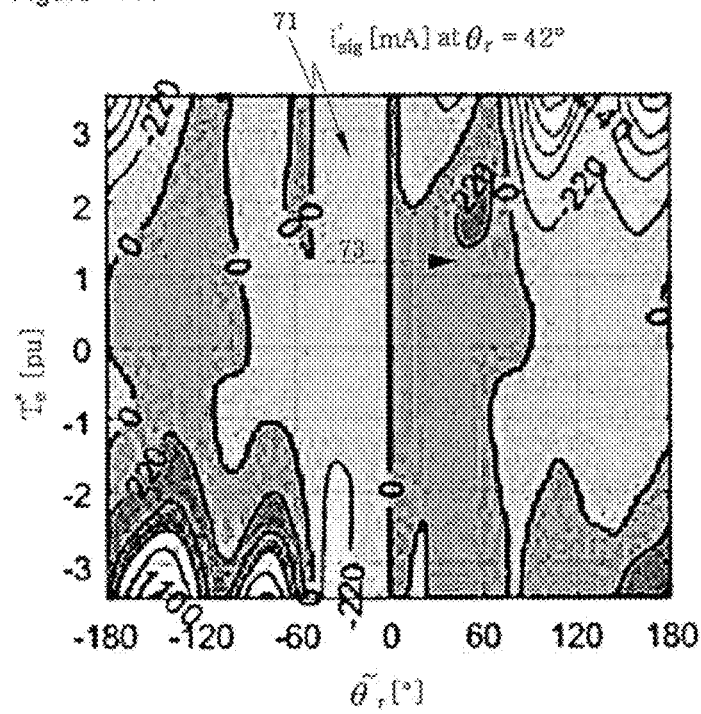
Figure 7I:
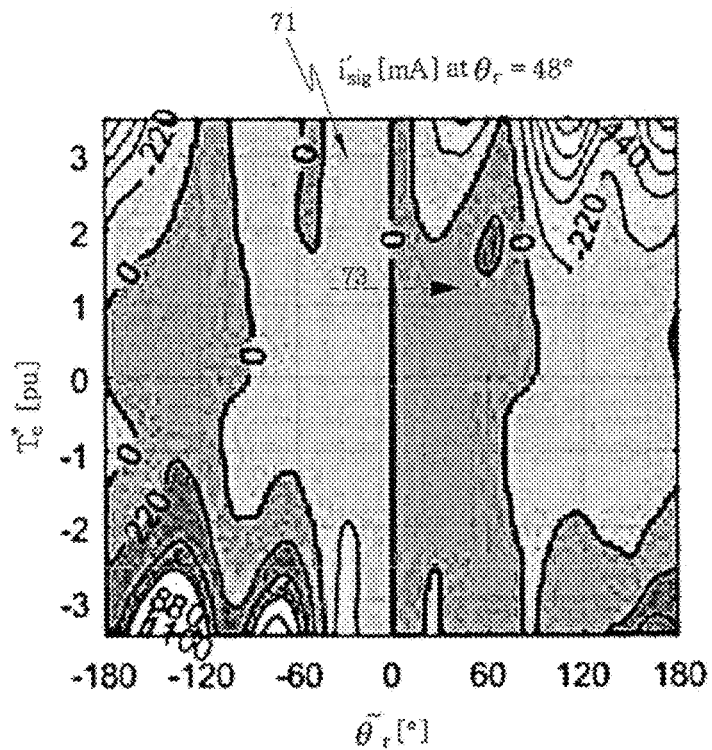
Figure 7J:
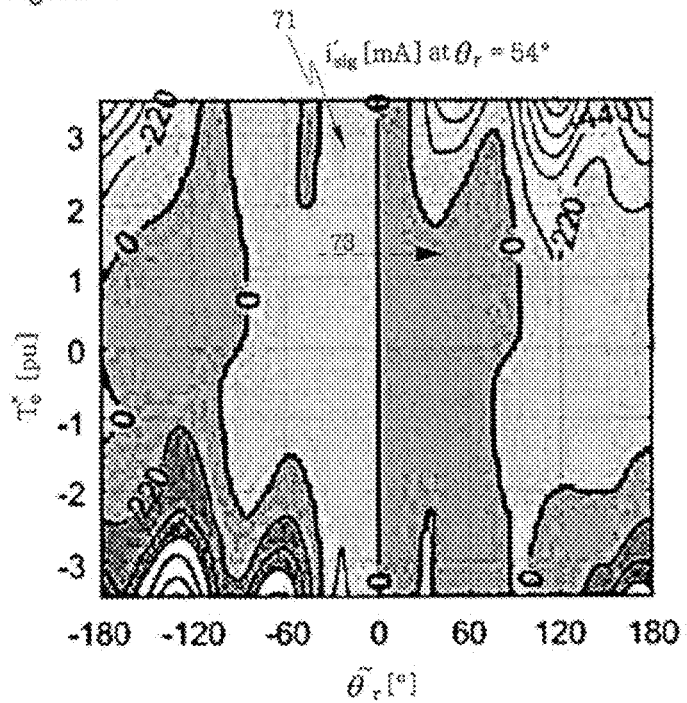

FIG. 6 is a block diagram showing a motor control apparatus 100 according to an embodiment of the present disclosure.

A motor 101 is a device that converts electrical energy into mechanical energy by using a force that a conductor where a current flows receives in a magnetic field. The motor may be classified into a DC motor and an AC motor according to the type of power source, and the motor 101 in the embodiment of the present disclosure refers to an AC motor. The AC motor may be classified again into a three-phase AC motor and a single-phase AC motor, and the embodiment of the present disclosure will be described based on the three-phase AC motor, for convenience, even though it is not specifically limited to the type of AC motor.

The motor control apparatus 100 estimates a rotor position of the motor 101 and controls the operation in a sensorless manner. The motor control apparatus 100 may include a current controller 110, a high frequency voltage generator 120, an inverter 140 and an angle estimator 180, without being limited thereto, and may include only some of the above components or further include additional components.

The current controller 110 generates a fundamental wave voltage command ($v_{dqsf}^{\hat{r}*}$) on the basis of a torque command ($T_e^*$) for driving the motor 101 and a fundamental wave current ($i_{dqsf}^{\hat{r}}$) of the motor 101. The current controller 110 may stably control the motor 101 by generating the fundamental wave voltage command ($v_{dqsf}^{\hat{r}*}$) through the feedback in consideration of the fundamental wave current ($i_{dqsf}^{\hat{r}}$) and the torque command ($T_e^*$) of the actual motor 101.

In an embodiment, a current command generator (a MTPA block) may be further included. The current command generator (MTPA) may generate a fundamental wave current command ($i_{dqsf}^{\hat{r}*}$) for rotating the rotor of the motor. Specifically, the current command generator may generate a required fundamental wave current command ($i_{dqsf}^{\hat{r}*}$) on the basis of the torque command ($T_e^*$). In another embodiment, the current command generator may also generate the fundamental wave current command ($i_{dqsf}^{\hat{r}*}$) on the basis of the estimated angle ($\hat{\theta}_r$) of the rotor of the motor 101 estimated by the angle estimator 180. Thus, the current controller 110 may generate the fundamental wave voltage command ($v_{dqsf}^{\hat{r}*}$) on the basis of the fundamental wave current command ($i_{dqsf}^{\hat{r}*}$) and/or the fundamental wave current ($i_{dqsf}^{\hat{r}}$) generated by the current command generator. In addition, the fundamental wave current ($i_{dqsf}^{\hat{r}}$) input to the current controller 110 may be an estimated d-axis component or an estimated q-axis component on the estimated coordinate system.

The high frequency voltage generator 120 may generate a high frequency voltage command ($v_{dqsh}^{\hat{r}*}$), which is added to the fundamental wave voltage command ($v_{dqsf}^{\hat{r}*}$), for sensorless control of the motor 101. The high frequency voltage command ($v_{dqsh}^{\hat{r}*}$) has a higher frequency than a driving frequency of the motor 101 driven by the fundamental wave voltage command output from the current controller 110.

The high frequency voltage generator 120 may generate the high frequency voltage command in an estimated d-axis on the estimated coordinate system. Namely, the injected high frequency voltage command ($v_{dqsh}^{\hat{r}*}$) may include only the estimated d-axis component. The fundamental wave voltage command ($v_{dqsf}^{\hat{r}*}$) and the high frequency voltage command ($v_{dqsh}^{\hat{r}*}$) may be added by an adder 10 and transmitted to the inverter 140.

In an embodiment of the present disclosure, the motor control apparatus 100 may further include a first coordinate converter 130 or a second coordinate converter 150.

The first coordinate converter 130 may perform reference coordinate transformation to the sum of the fundamental wave voltage command ($v_{dqsf}^{\hat{r}*}$) and the high frequency voltage command ($v_{dqsh}^{\hat{r}*}$) on the basis of the estimated angle ($\hat{\theta}_r$) from an estimated synchronous coordinate system ($d\hat{r}$, $q\hat{r}$) to a stationary coordinate system. The second coordinate converter 150 may perform reference coordinate transformation to the current ($i_{dqs}^{\hat{r}}$) of the motor 101 on the basis of the estimated angle ($\hat{\theta}_r$) from a stationary coordinate system to an estimated synchronous coordinate system.

The inverter 140 may apply a voltage ($v_{abcs}$) to the stator of the motor 101 on the basis of the voltage command ($v_{dqs}^{\hat{r}*}$). The stator of the motor 101 rotates the rotor since the stator voltage forms a rotating magnetic field by the applied voltage ($v_{abcs}$). The inverter 140 may be a single-phase inverter or a multi-phase inverter.

The angle estimator 180 may estimate the position of the rotor of the motor 101 on the estimated coordinate system on the basis of the current signal ($i_{sig}$) of the motor 101. Namely, the angle estimator 180 may output an estimated angle ($\hat{\theta}_r$). The current signal ($i_{sig}$) may be a signal obtained by demodulating the high frequency current component ($i_{dqsh}^{\hat{r}}$) extracted from the motor current ($i_{dqs}^{\hat{r}}$) of the motor 101.

Referring to FIG. 6, a signal in a predetermined high frequency region of the motor current ($i_{dqs}^{\hat{r}}$) obtained from the motor stator may be filtered through a filter 160 to generate the fundamental wave current ($i_{dqsf}^{\hat{r}}$). The filter 160 may be a notch filter or a low-pass filter.

A subtractor 20 may generate a high frequency current ($i_{dqsh}^{\hat{r}}$) by subtracting the fundamental wave current ($i_{dqsf}^{\hat{r}}$) from the motor current ($i_{dqs}^{\hat{r}}$). In this specification, the "motor current" may include a fundamental wave current or a harmonic wave current, and the "motor voltage" may include a fundamental wave voltage or a harmonic wave voltage.

The current signal ($i_{sig}$) is a result obtained by dividing the estimated q-axis current ripple of the high frequency current ($i_{dqsh}^{\hat{r}}$) by the clock signal.

As described above, the current signal ($i_{sig}$) changes according to the angular error. More specifically, the current signal ($i_{sig}$) is a value changing according to the torque command ($T_e^*$), the position ($\theta_r$) of the rotor and a first angular error (a difference between the estimated angle and the position (angle) of the rotor, $\tilde{\theta}_r$). Thus, the current signal ($i_{sig}$) may be expressed as a function of the torque command ($T_e^*$), the position ($\theta_r$) of the rotor and the first angular error ($\tilde{\theta}_r$) as in Equations 4 and 5.

The motor control apparatus 100 according to an embodiment of the present disclosure may further include a compensator 170. The compensator 170 may add a first compensation signal ($i_{comp}$) to the current signal ($i_{sig}$). For clear explanation, the sum of the current signal ($i_{sig}$) and the first compensation signal ($i_{comp}$) is referred to as a first compensation current signal ($i_{sig}'$). In this case, the signal input to the angle estimator 180 is the first compensation current signal. In an embodiment, the first compensation current signal or the current signal may be amplified and input to the angle estimator 180.

According to an embodiment of the present disclosure, the compensator 170 may change the signal input to the angle estimator 170 by adding the first compensation signal ($i_{comp}$) to the current signal ($i_{sig}$), and as a result, the convergence point of the angle estimator 170 may be changed.

The first compensation signal ($i_{comp}$) to which a predetermined torque command and a predetermined rotor position are applied may change the magnitude of the current signal ($i_{sig}$) without changing the waveform thereof.

In an embodiment, the first compensation signal ($i_{comp}$) may be determined as in Equation 6 below such that the angular error ($\tilde{\theta}_r$) becomes 0 with respect to each torque command ($T_e^*$) and each position ($\theta_r$) of the rotor.

$$i_{comp}(T_e^*, \hat{\theta}_r) = -i_{sig}|_{\tilde{\theta}_r=0} = -I_\Delta(T_e^*, 0, \hat{\theta}_r) \cdot \sin(-2\phi_\Delta(T_e^*, 0, \hat{\theta}_r)) \quad \text{[Equation 6]}$$

In this case, the first compensation current signal ($i_{sig}'$) may be expressed as in Equation 7 below.

$$i_{sig}' = i_{sig} + i_{comp}(T_e^*, \hat{\theta}_r) \quad \text{[Equation 7]}$$

More specifically, the first compensation signal ($i_{comp}$) expressed in Equation 6 may be a predetermined constant value determined according to the torque command and the estimated angle, which changes only the magnitude of the current signal ($i_{sig}$) without changing the shape of the waveform thereof.

The first compensation current signal ($i_{sig}'$) generated as above is input to the angle estimator 180, and the angle estimator 180 may estimate the position of the rotor on the basis of the first compensation current signal ($i_{sig}'$).

FIGS. 7A to 7J show a first compensation current signal ($i_{sig}'$) according to the torque command and the angular error at various rotor positions. Similar to FIGS. 5A to 5J, in FIGS. 7A to 7J, a region 71 represents a portion where the first compensation current signal ($i_{sig}'$) is a negative number, and an arrow 73 represents a portion where the first compensation current signal ($i_{sig}'$) makes zero up-crossing.

Referring to FIGS. 7A to 7J, in each rotor position range and each torque command range, it may be found that the angular error ($\tilde{\theta}_r$) of the angle estimator 180 becomes 0 because the first compensation current signal ($i_{sig}'$) must make zero up-crossing in a region where the angular error ($\tilde{\theta}_r$) is 0. Namely, the rotor position may be estimated accurately.

Seeing Equation 6 again, it may be found that the first compensation signal is expressed as a function of the torque command ($T_e^*$) and the estimated angle ($\hat{\theta}_r$). Thus, the motor control apparatus 100 according to an embodiment of the present disclosure may further include a reference table storing unit 175 for storing a corresponding relationship reference table of each torque command ($T_e^*$) and each estimated angle ($\hat{\theta}_r$) of the motor. The compensator 170 may generate the first compensation signal ($i_{comp}$) on the basis of the corresponding relationship reference table stored in the reference table storing unit 175 and the torque command ($T_e^*$) and the estimated angle ($\hat{\theta}_r$) presently input to the current controller 110.

Since the relationship of the torque command according to the position of the rotor may be different for individual motors, the corresponding relationship of the torque command and the estimated angle for individual motors at which the angular error becomes 0 and each value (the torque command value and the estimated angle value) may be calculated through a motor test and stored in advance. That is, the first compensation signal for individual motors may be prepared in advance and used for motor control.

Second Embodiment (Compensation of the Current Signal, Application of an Injection Axis)

Figure 8:
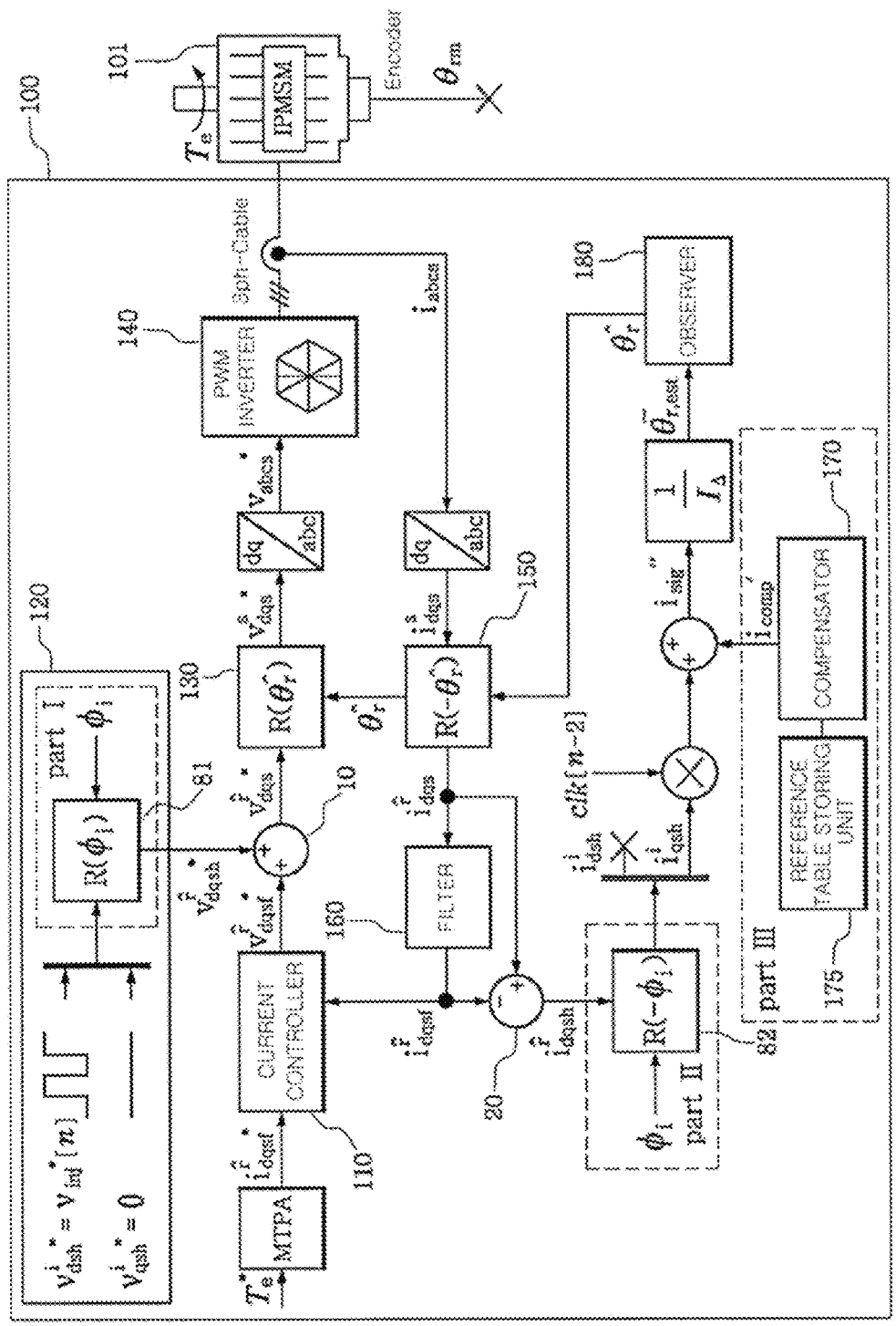
FIG. 8 is a block diagram showing a motor control apparatus 100 according to an embodiment of the present disclosure.

FIG. 8 is a block diagram showing a motor control apparatus 100 according to an embodiment of the present disclosure.

Referring to FIG. 7G again, if the rotor is located near 36° and the torque command is 2.2 pu, the first compensation current signal ($i_{sig}'$) does not make zero up-crossing at the point ($\tilde{\theta}_r=0$) where the first angular error is 0, but, after reaching 0, decreases again to be a negative number (see an arrow 73'). This driving point is a point where the estimated angle of the angle estimator cannot be converged, and accordingly the estimated angle may be converged to an unstable point or diverged. In order to solve this problem, it is required to control the current signal by correcting the waveform of the current signal (or, the compensation current signal) input to the angle estimator so as to prevent that the angular error approaches the point of 0 and thus the zero down-crossing portion is located thereto.

The motor control apparatus 100 according to an embodiment of the present disclosure as shown in FIG. 8 may change the waveform of the current signal (or, the compensation current signal) input to the angle estimator 180 by changing the injected high frequency voltage signal to an axis (hereinafter, an injection axis) other than the estimated d-axis. Namely, in the first embodiment described above, the high frequency voltage is injected to the estimated d-axis (d$\hat{r}$), and the magnitude of the estimated q-axis (q$\hat{r}$) current ripple generated at this time is used as an input to the angle estimator. However, in the second embodiment of FIG. 8, the axis to which the high frequency voltage signal is injected is changed. The second embodiment may include at least one of a case where the injection angle is applied and a case where the compensation current is applied along with the injection angle.

In the second embodiment, the high frequency voltage generator 120 of the motor control apparatus 100 may apply the high frequency voltage command ($v_{dqsh}^{i*}$) to the injected d-axis on the basis of the injection coordinate system, and the angle estimator 180 may estimate the position of the rotor on the basis of an injected q-axis component of the current signal ($i_{sig}$). That is, the high frequency voltage is injected to the injected d-axis (di) rather than the estimated d-axis, and the magnitude of the injected q-axis (qi) current ripple generated at this time is used as an input to the angle estimator 180. Meanwhile, even in this case, the current controller 110 receives and determines the fundamental wave current ($i_{dqsf}^{\hat{r}}$) on the basis of the estimated coordinate system and generates the voltage command ($v_{dqsf}^{\hat{r}*}$).

Referring to FIG. 8, compared with the motor control apparatus 100 of FIG. 6, the injection angle (the injected d-axis) of the high frequency voltage command ($v_{dqsh}^{i*}$) and the angle (the injected q-axis) of the current signal ($i_{sig}$) and the compensation signal ($i_{comp}$) input to the angle estimator 180 are different.

Figure 9:
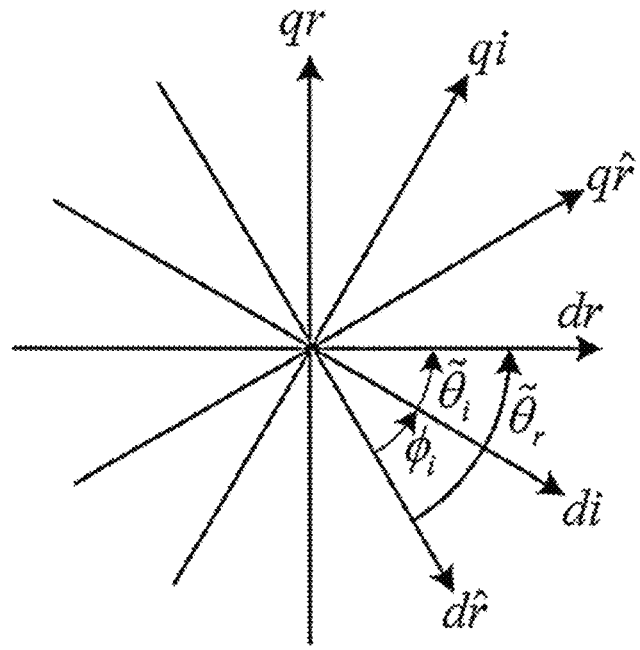
FIG. 9 shows a relationship of a synchronous coordinate system (dr, qr), an estimated synchronous coordinate system (d$\hat{r}$, q$\hat{r}$) and an injection coordinate system (di, qi) indicating an actual rotor position.

FIG. 9 shows a relationship of a synchronous coordinate system (dr, qr), an estimated synchronous coordinate system (dr̂, qr̂) and an injection coordinate system (di, qi) indicating an actual rotor position. Referring to FIG. 9, the injected d-axis is defined as being ahead of the estimated coordinate system d-axis by the injection angle ($\phi_i$) (this may be inverted in another embodiment). In this case, the relationship of the first angular error ($\tilde{\theta}_r$), the injection angle ($\phi_i$) and a second angular error (a difference between the synchronous d-axis and the injection d-axis, $\tilde{\theta}_i$) may be as in Equation 8 below.

$$\tilde{\theta}_r = \tilde{\theta}_i + \phi_i \quad \text{[Equation 8]}$$

For clear explanation, the terms are arranged such that $\tilde{\theta}_r$ is the first angular error, $\tilde{\theta}_i$ the second angular error, and $\phi_i$ is the injection angle.

The current signal ($i_{sig}$) obtained by dividing the current ripple of the injected q-axis by the clock signal when the high frequency voltage is injected to the injected d-axis is expressed as a function of the second angular error ($\tilde{\theta}_i$) as in Equation 9 below. As mentioned above, it is found that the current signal ($i_{sig}$) is expressed as a function of the torque command, the rotator angle and the first angular error. In this embodiment, since a new variable of the injection angle ($\phi_i$) is applied, the current signal is expressed as a function further including the injection angle as in Equation 9 below.

$$i_{sig}(T_e^*, \tilde{\theta}_i, \theta_r, \phi_i) = I_\Delta(T_e^*, \tilde{\theta}_i + \phi_i, \theta_r) \cdot \sin(2\tilde{\theta}_i - 2\phi_\Delta(T_e^*, \tilde{\theta}_i + \phi_i, \theta_r)) \quad \text{[Equation 9]}$$

Seeing Equation 9, different from Equation 5 that is a function having 3 variables, the current signal ($i_{sig}$) becomes a function having 4 variables. By using a method of turning the injection angle (rotating the coordinate system from the estimated angle by the injection angle), the current driving point corresponding to any angular error is rotated by the injection angle ($\phi_i$). Thus, $I_\Delta$ and $\phi_\Delta$ determined by the current driving point have different values from the existing values with respect to the first angular error. Thus, according to an embodiment of the present disclosure, the waveform of the current signal ($i_{sig}$) may be changed by transforming the corresponding relationship of the first angular error ($\tilde{\theta}_r$) and the current driving point (namely, the torque command).

Equation 9 may be arranged as a function of the first angular error ($\tilde{\theta}_r$) as in Equation 10 below.

$$i_{sig}(T_e^*, \tilde{\theta}_r, \theta_r, \phi_i) = I_\Delta(T_e^*, \tilde{\theta}_r, \theta_r) \cdot \sin(2(\tilde{\theta}_r - \phi_i) - 2\phi_\Delta(T_e^*, \tilde{\theta}_r, \theta_r)) \quad \text{[Equation 10]}$$

Seeing Equation 10, it may be found that the waveform of the current signal ($i_{sig}$) is changed according to the injection angle ($\phi_i$).

Figure 10A:
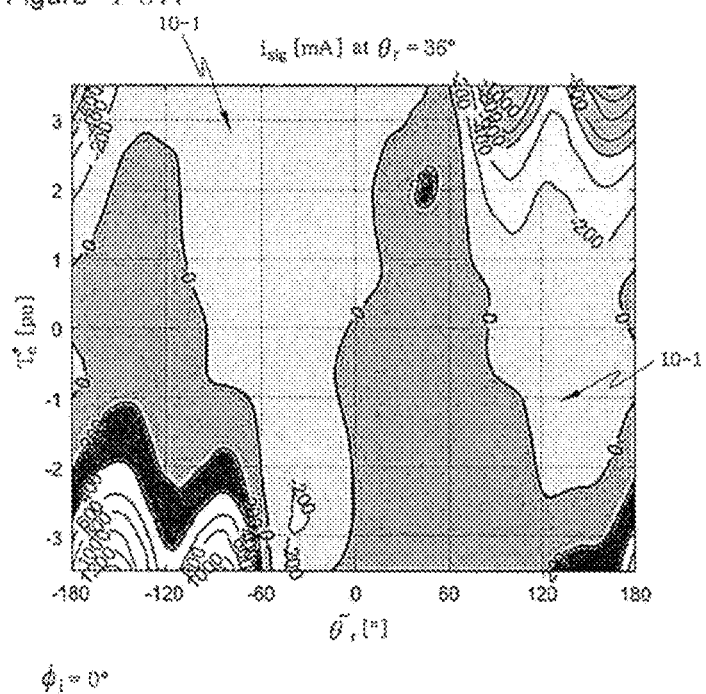
FIGS. 10A and 10B show a current signal ($i_{sig}$) for a first angular error ($\tilde{\theta}_r$) and a torque command ($T_e^*$) when the position of the rotor is 36° and the injection angle is 0°, 30°.
Figure 10B:
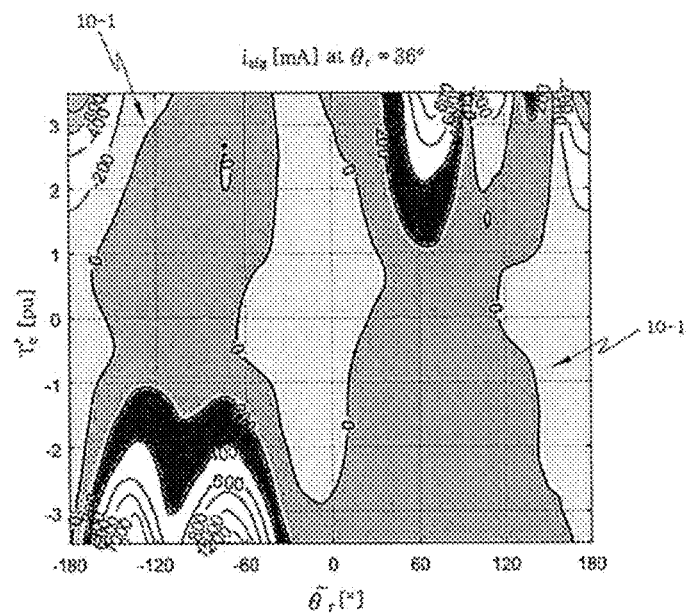
Figure 11A:
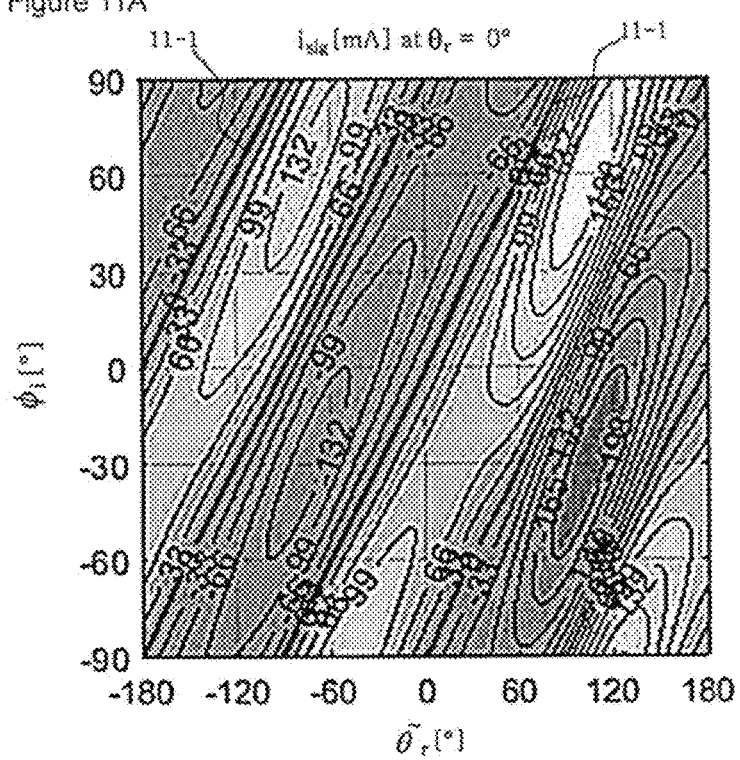
Figure 11D:
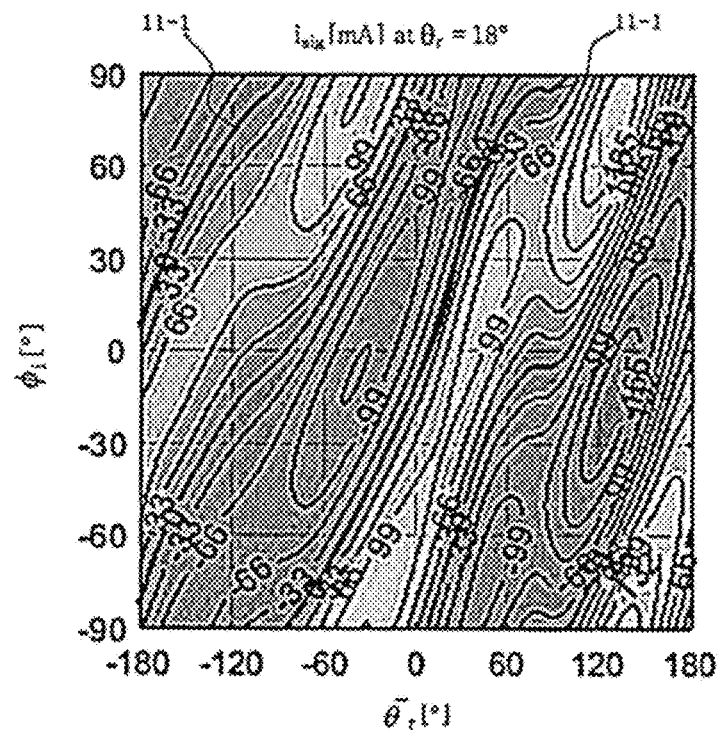
Figure 11E:
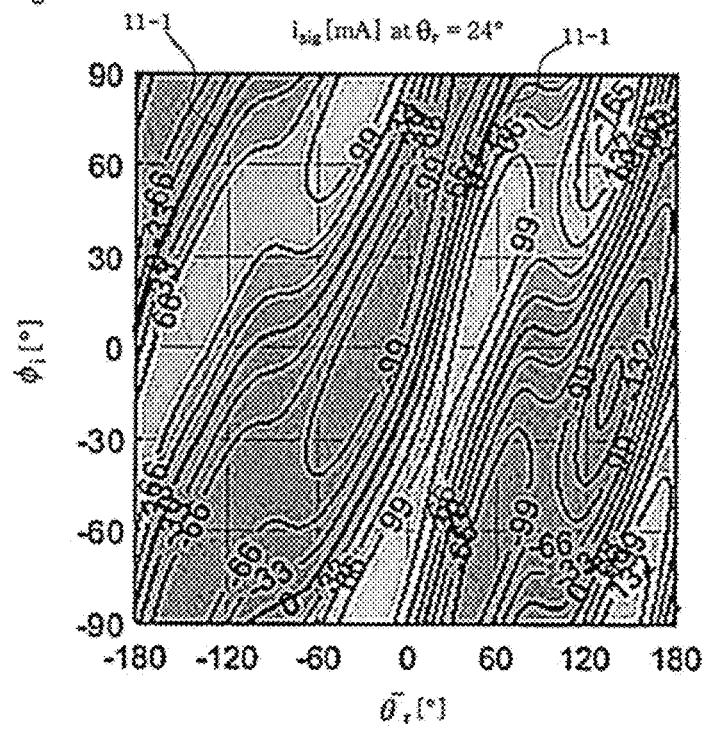
Figure 11F:
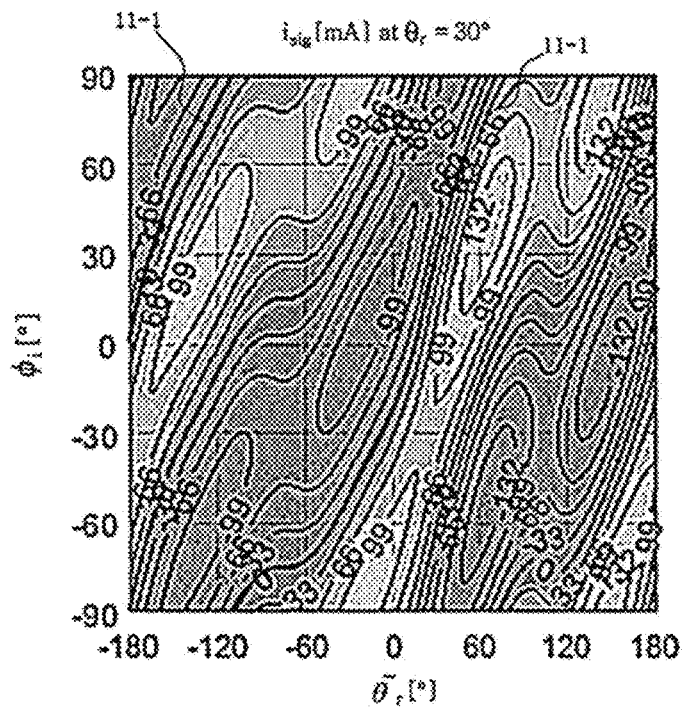
Figure 11G:
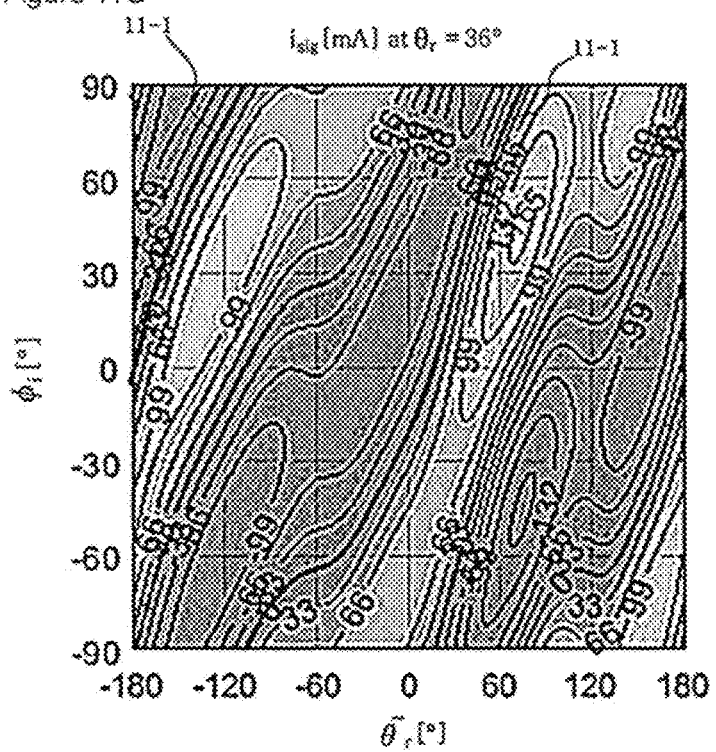
Figure 11H:
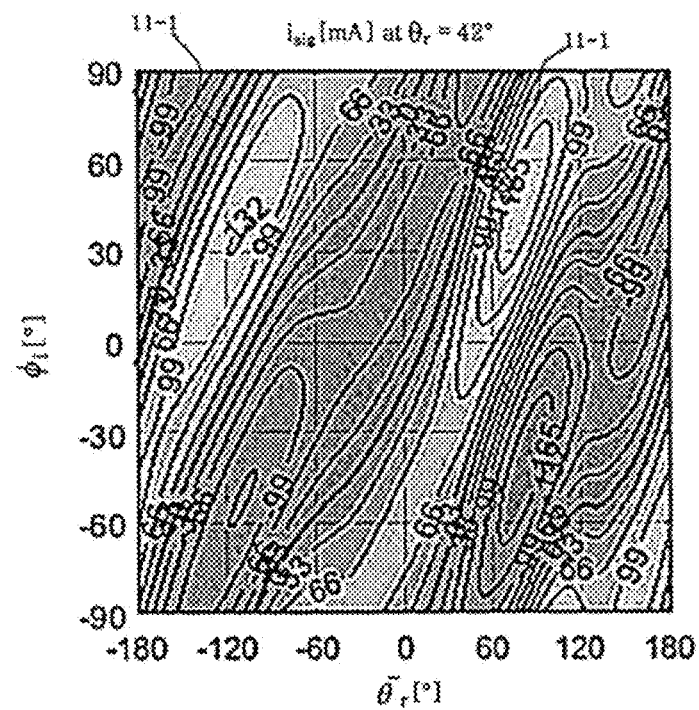
Figure 11I:
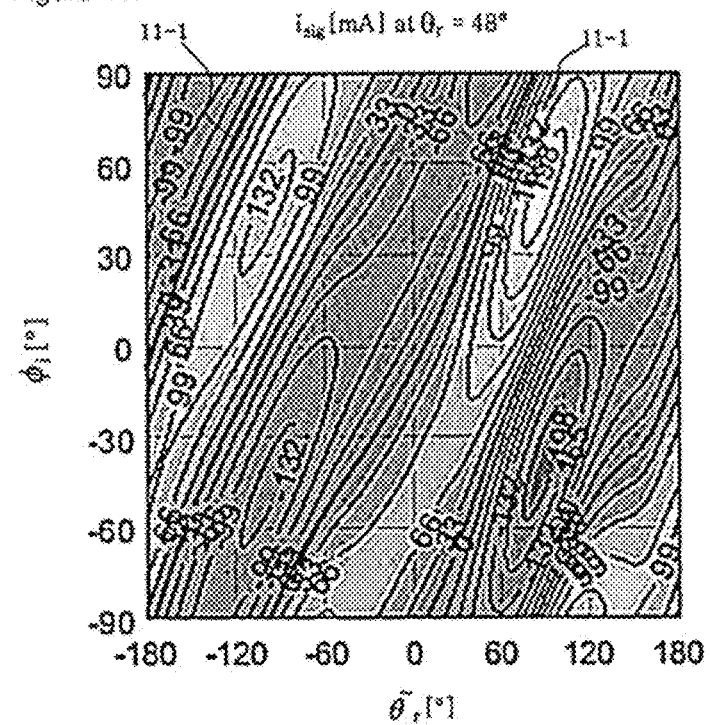
Figures 11J, 12A:
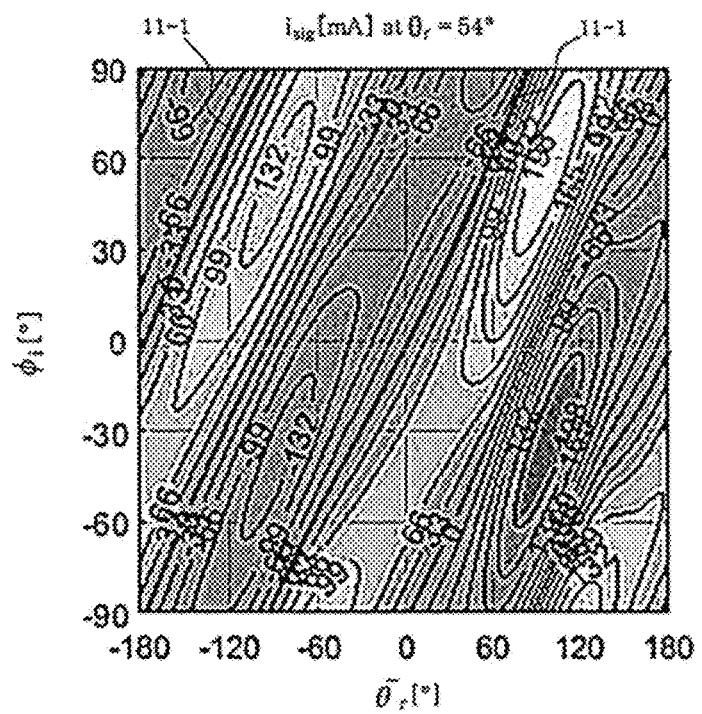
Figure 12B:
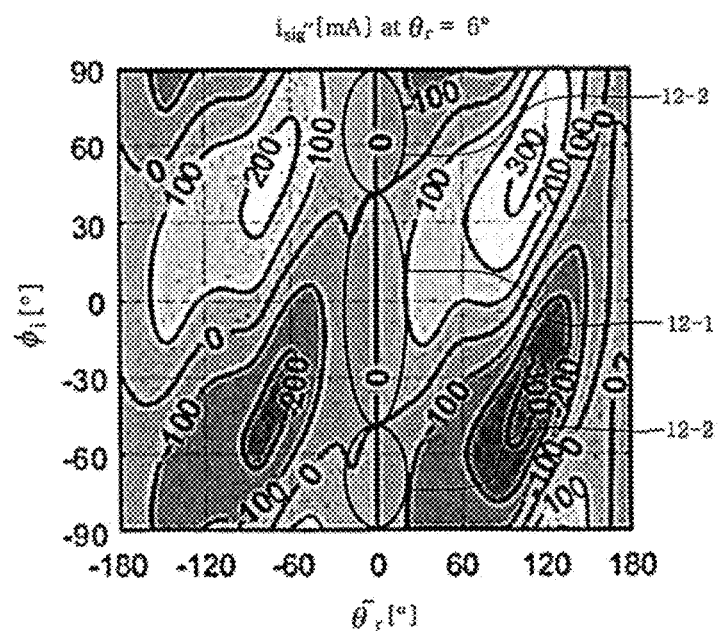
Figure 12C:
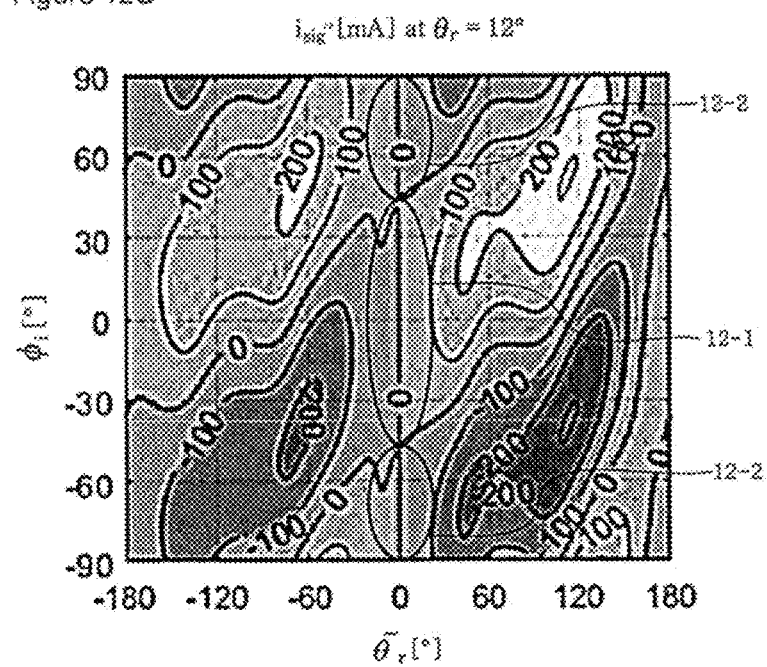
Figure 12D:
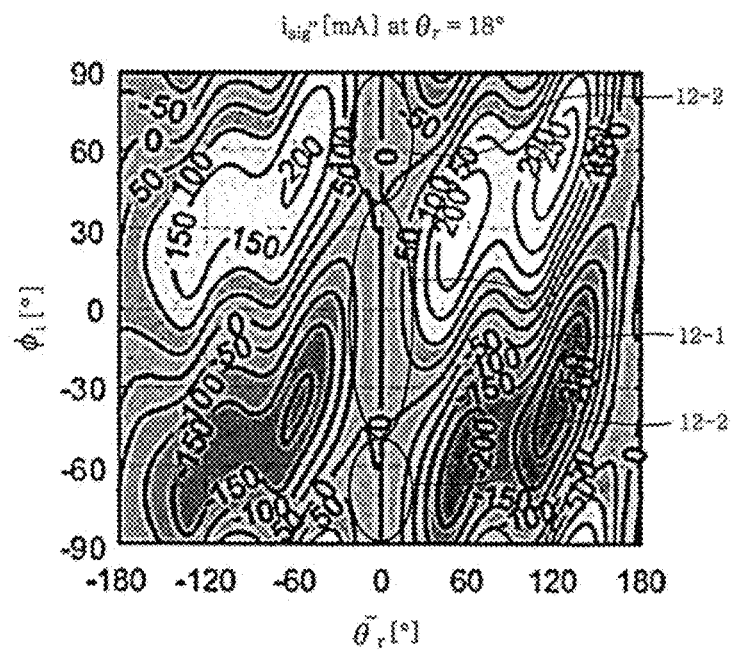
Figure 12E:
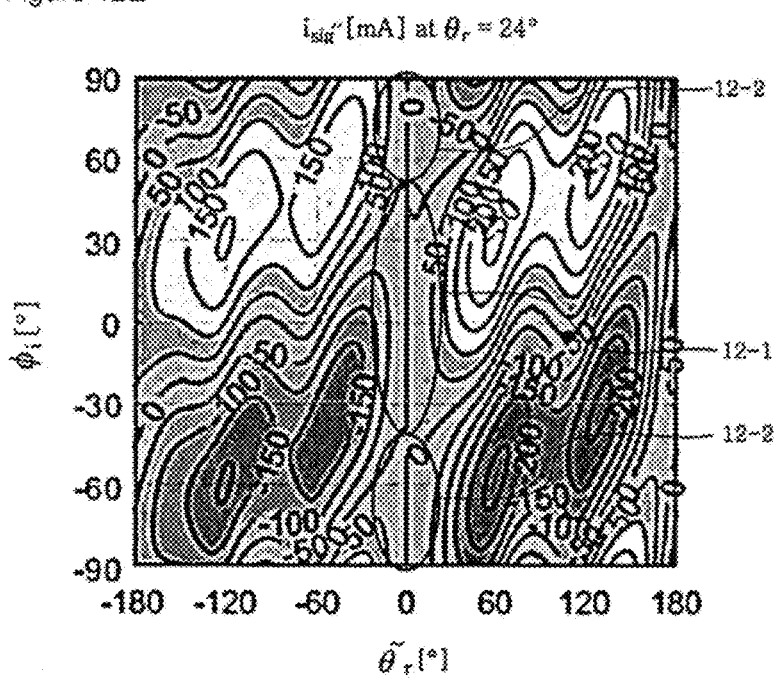
Figure 12F:
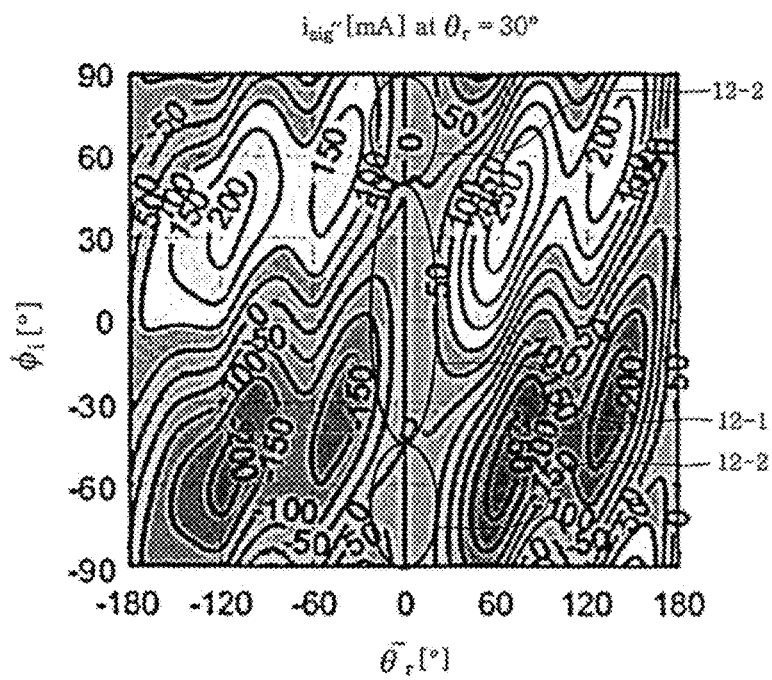
Figure 12G:
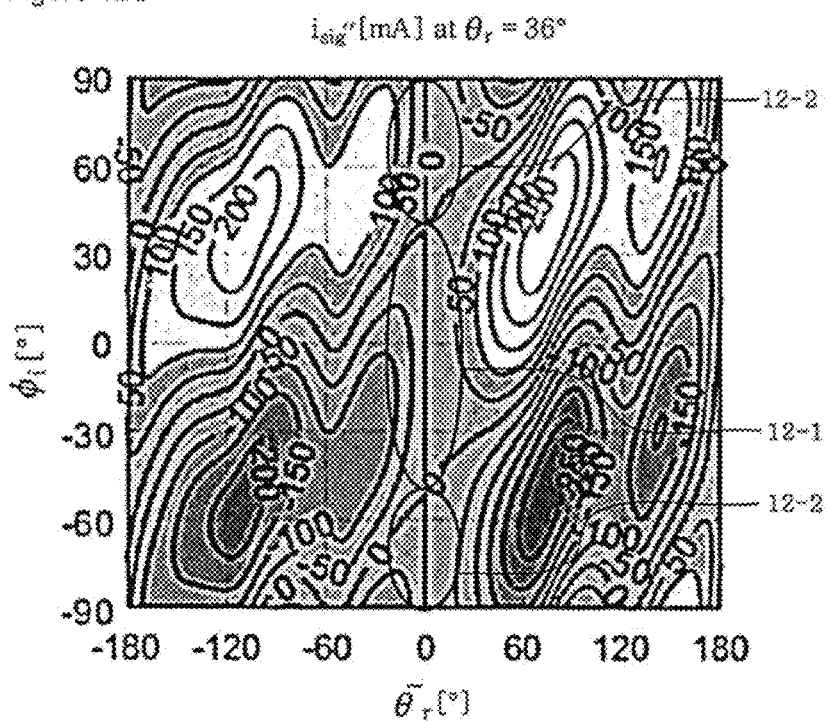
Figure 12H:
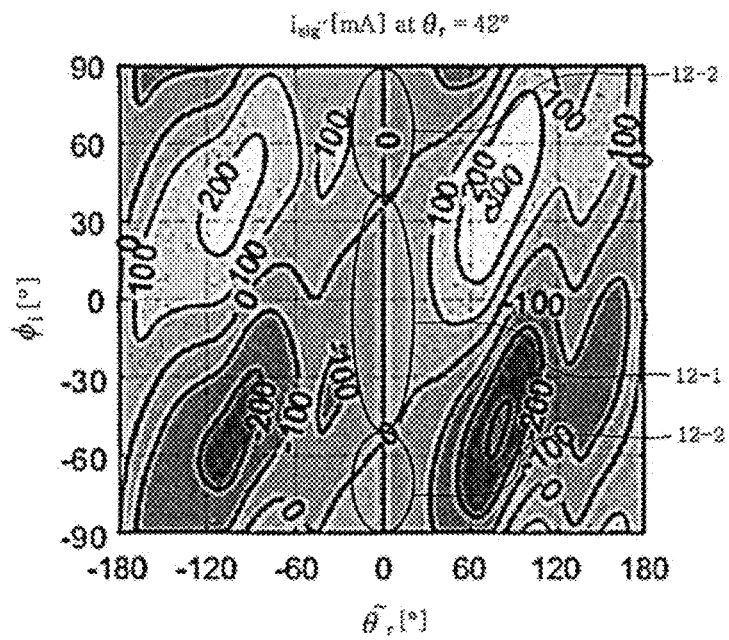
Figure 12I:
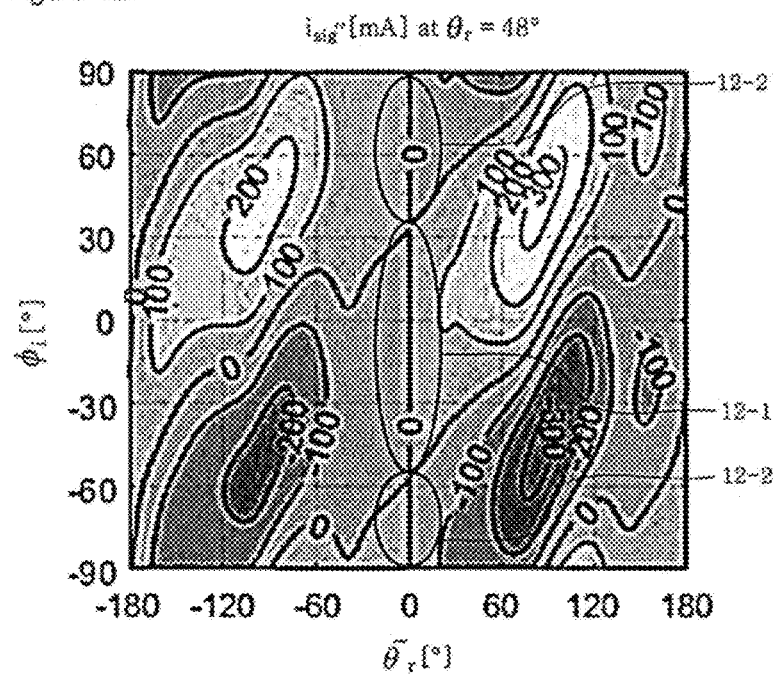
Figure 12J:
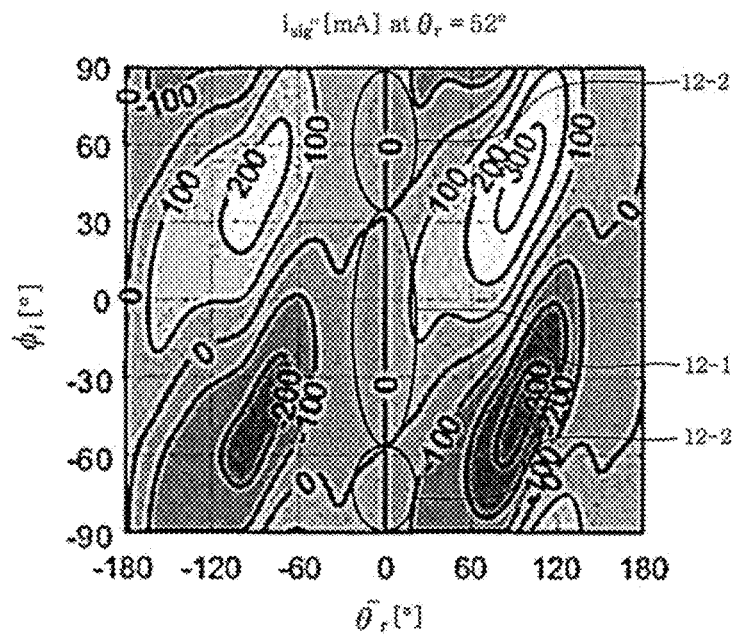
Figure 13A:
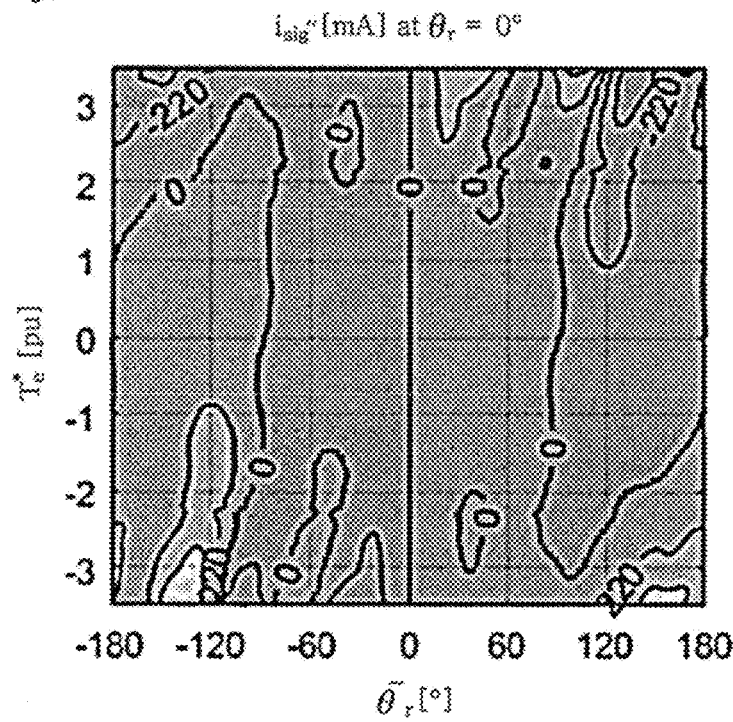
FIGS. 13A to 13J show a second compensation current signal to which an injection axis is applied and the current signal (FIGS. 11A to 11J) is compensated.
Figure 13B:
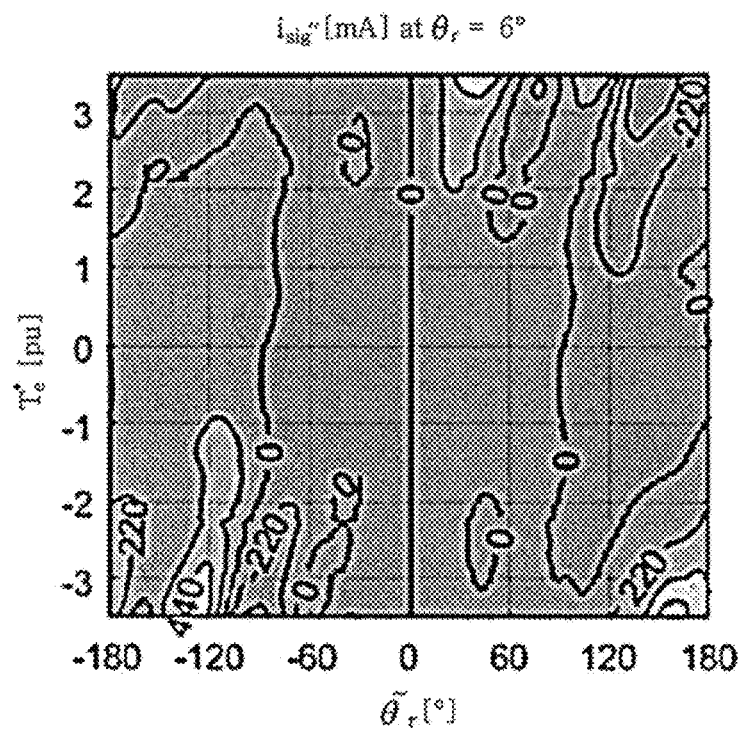
Figure 13C:
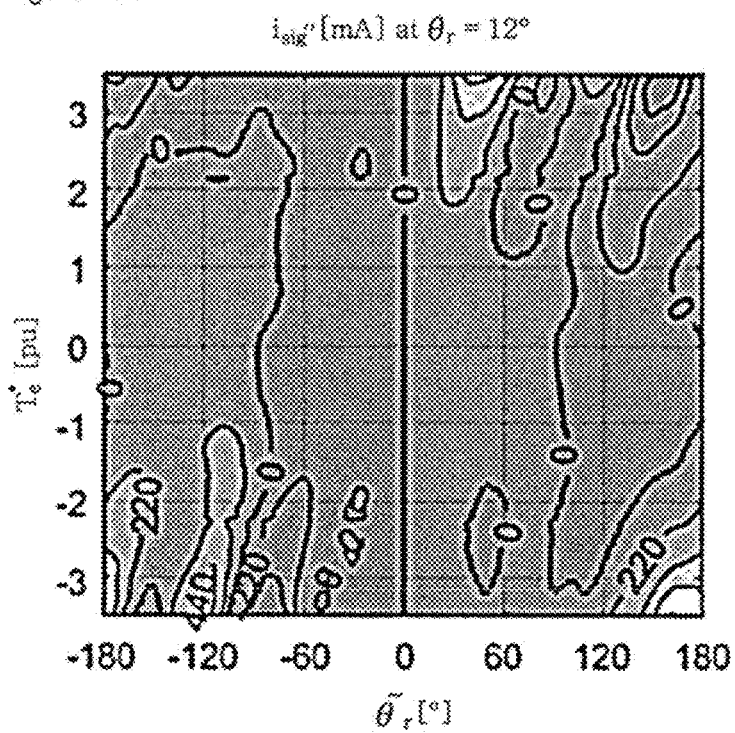
Figure 13D:
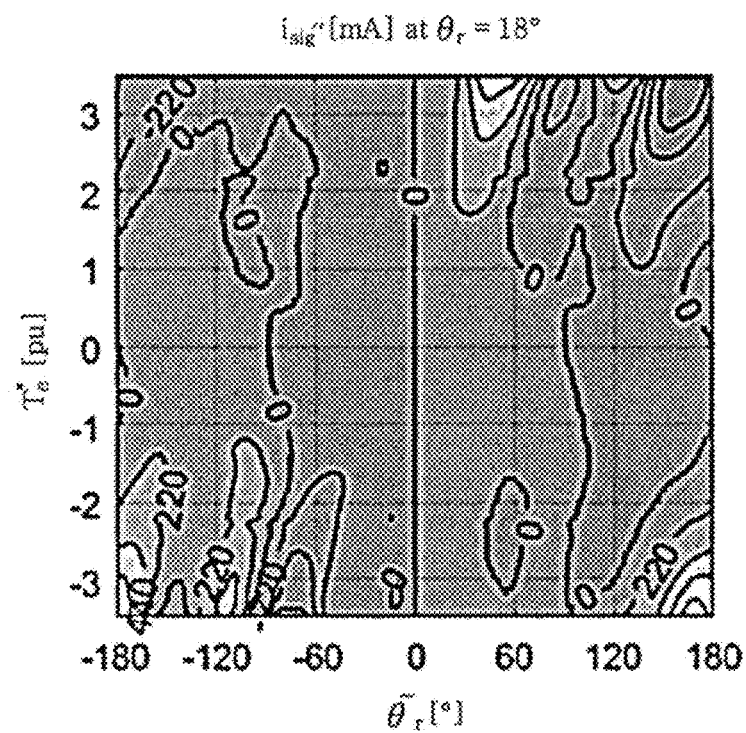
Figure 13E:
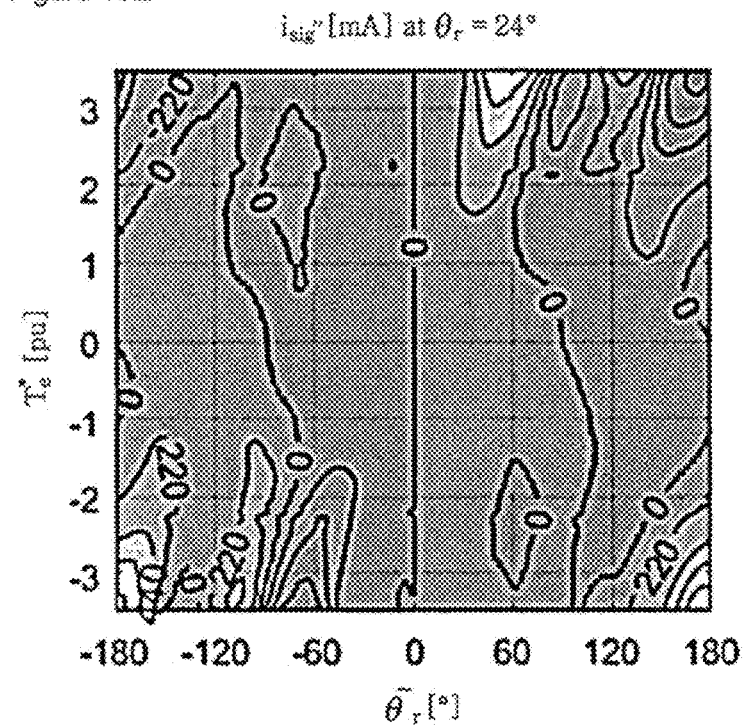
Figure 13F:
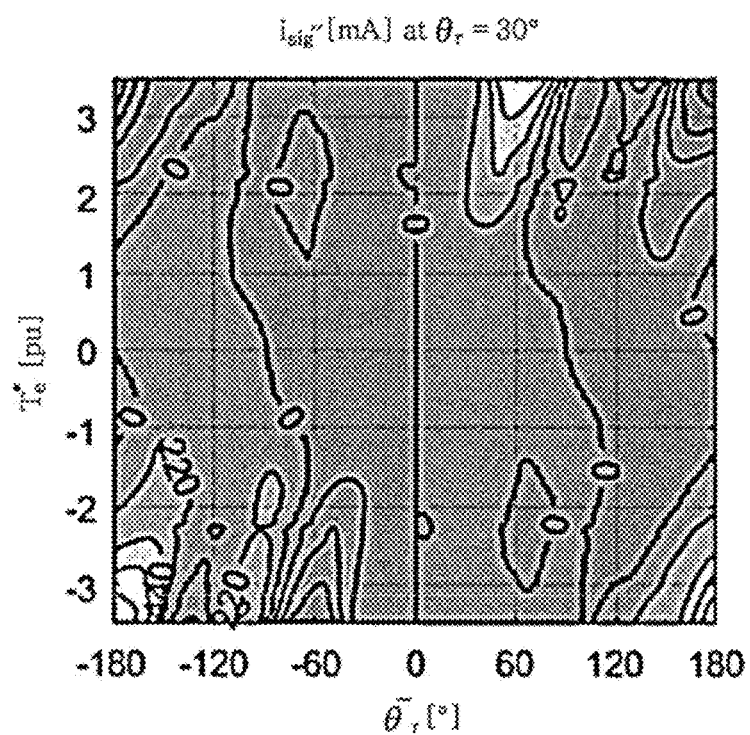
Figure 13G:
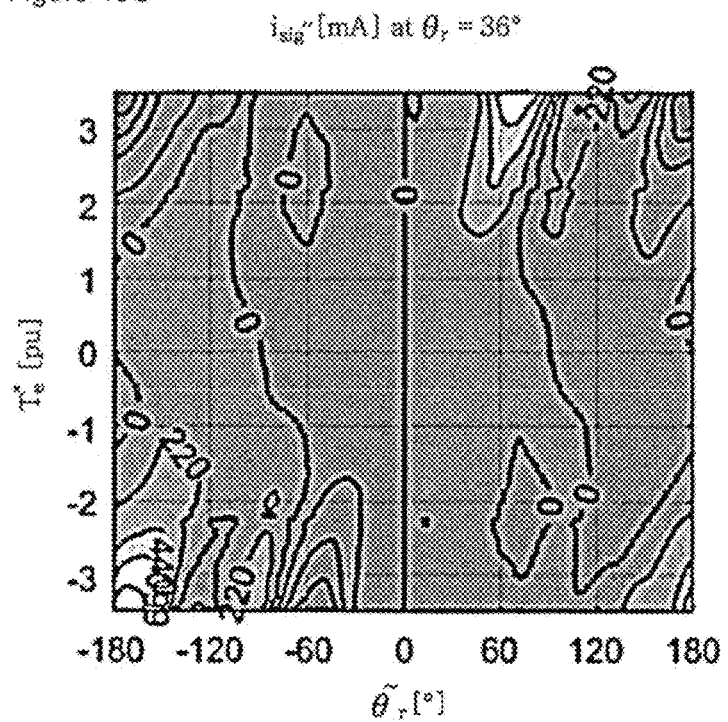
Figure 13H:
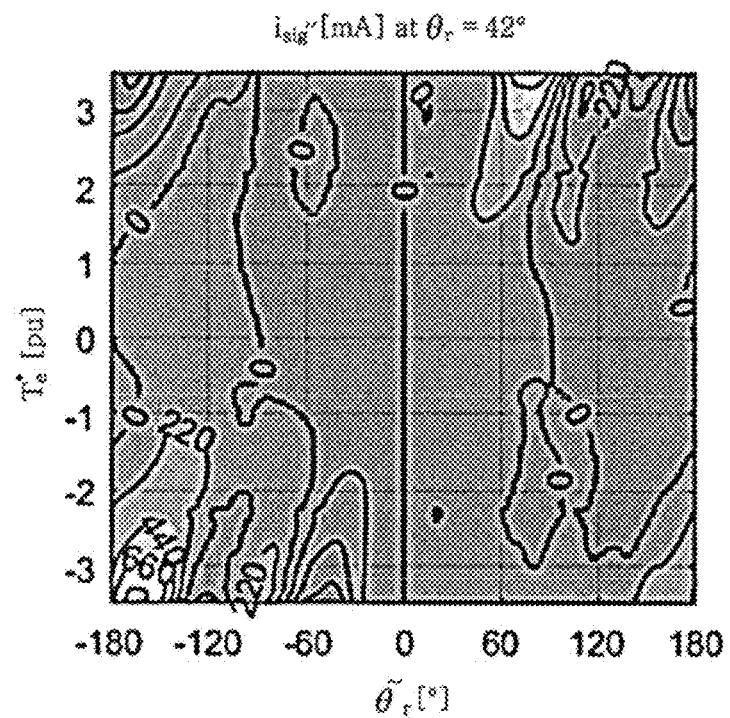
Figure 13I:
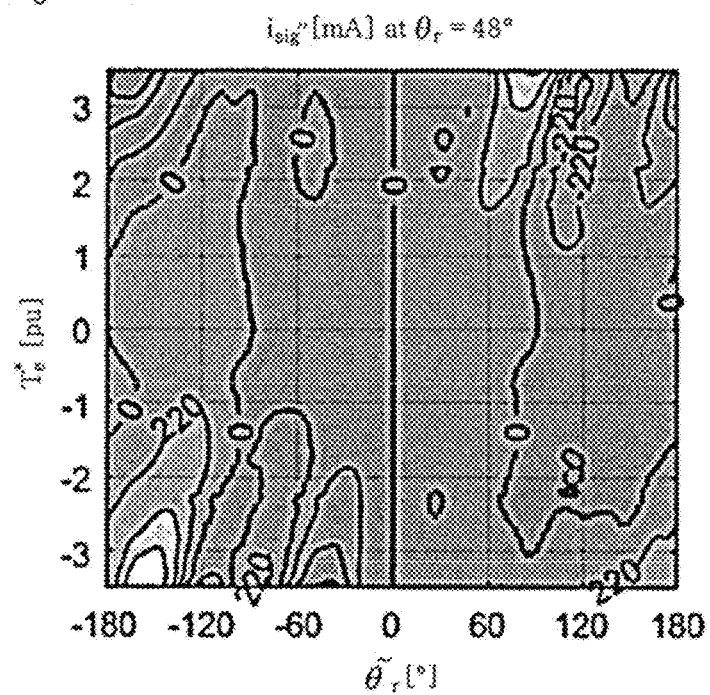
Figure 13J:
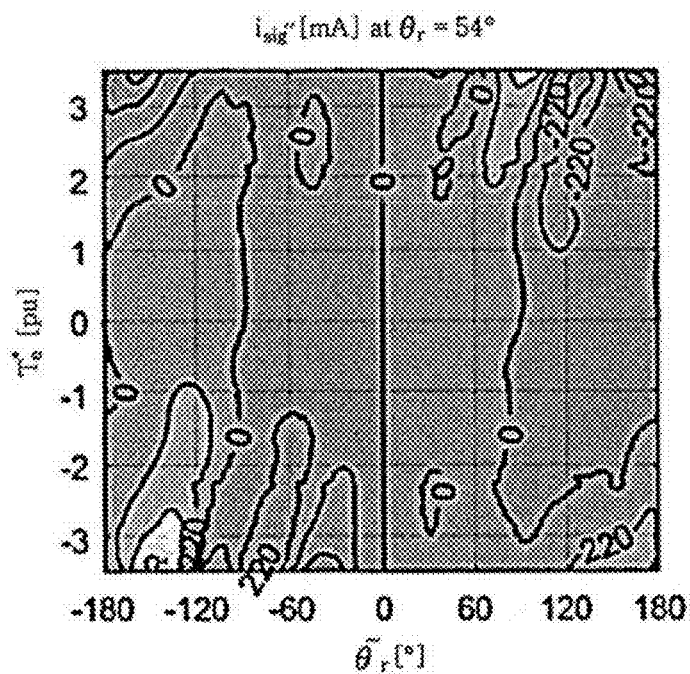

FIGS. 10A and 10B show a current signal ($i_{sig}$) for a first angular error ($\tilde{\theta}_r$) and a torque command ($T_e^*$) when the position of the rotor is 36° and the injection angle is 0°, 30°. In FIGS. 10A and 10B, a region 10-1 represents a portion where the current signal ($i_{sig}$) is a negative value. Referring to FIGS. 10A and 10B, it may be found that the waveform of the current signal ($i_{sig}$) is changed according to the injection angle ($\phi_i$).

Thus, the waveform of the current signal may be changed by applying a suitable injection angle ($\phi_i$) according to each torque command ($T_e^*$) and each rotor position ($\theta_r$), resultantly solving the above problem (caused since the angular error approaches a portion of 0 to generate zero down-crossing).

Hereinafter, a method of finding values of the injection angle and the compensation signal required according to the torque command and the rotor position will be described.

In practice, both the injection angle and the compensation signal are variable elements according to the torque command and the rotor position. However, for simplicity of explanation, it is assumed below that the injection angle is a value changing only for the torque command and the compensation signal is a value changing according to the torque command and the rotor position as in the first embodiment.

FIGS. 11A to 11J show a current signal $i_{sig}(T_e^*, \tilde{\theta}_r, \theta_r, \phi_i)$ according to the first angular error ($\tilde{\theta}_r$) and the injection angle ($\phi_i$) when the torque command has a predetermined value (1 pu) according to an embodiment of the present disclosure. In FIGS. 11A to 11J, a bold line 11-1 represents a point where the current signal ($i_{sig}$) makes zero up-crossing, and the angle estimator 180 determines this point as a convergence point.

The embodiment FIGS. 11A to 11J represents a case where the compensation signal is not applied.

In an embodiment, the compensator 170 may apply the second compensation signal ($i_{comp}'$) to the current signal ($i_{sig}$) as in Equation 11 below such that the angle estimator 180 is converged to a point where the angular error ($\tilde{\theta}_r$) is 0 for each injection angle.

$$i_{comp}'(T_e^*, \phi_i, \theta_r) = -i_{sig}|_{\tilde{\theta}_r=0} = -I_\Delta(T_e^*, 0, \theta_r) \cdot \sin(-2\phi_i - 2\phi_\Delta(T_e^*, 0, \theta_r)) \quad \text{[Equation 11]}$$

As a result, the angle estimator 180 may receive a second compensation current signal ($i_{sig}''$), which is the sum of the current signal ($i_{sig}$) and the second compensation signal ($i_{comp}'$), and estimate the position of the rotor.

FIGS. 12A to 12J show the second compensation current signal ($i_{sig}''$) obtained by adding the second compensation signal ($i_{comp}'$) as in Equation 11 to the current signal ($i_{sig}$) according to the first angular error ($\tilde{\theta}_r$) and the injection angle ($\phi_i$) when the torque command has a predetermined value (1 pu) according to an embodiment of the present disclosure.

In FIGS. 12A to 12J, the first portion 12-1 is a portion where the second compensation current signal ($i_{sig}''$) makes zero up-crossing and becomes a convergence point of the angle estimator 180. However, a second portion 12-2 is a portion where the second compensation current signal ($i_{sig}''$) makes zero down-crossing and cannot be a convergence point of the angle estimator 180.

Thus, by applying any injection angle corresponding to the first portion 12-1, it is possible to estimate the position of the rotor while removing the first angular error. For example, an intermediate value in the injection angle range corresponding to the first portion 12-1 may be representatively applied, and the intermediate value may be stored in advance.

That is, the injection angle may be determined within a range where the first angular error is 0 and the second compensation current signal becomes 0 while having a positive slope on the basis of the first angular error.

FIGS. 12A to 12J show the results of a specific torque command, and the above process may be repeatedly performed to all available torque commands to determine a suitable injection angle for every torque command.

Accordingly, a manufacturer of the motor control apparatus may generate a corresponding relationship reference table of the torque command ($T_e^*$) and the injection angle ($\phi_i$) according to the position ($\theta_r$) of the rotor, for individual motors. The corresponding relationship reference table may be stored in the reference table storing unit 175, and the compensator 170 may generate the second compensation signal by using the corresponding relationship reference table stored in the reference table storing unit 175.

As described above, the injection angle applicable to solve the first angular error resolution has a predetermined range, but an intermediate value within the predetermined range may also be used for convenience of calculation and data storage efficiency.

FIGS. 13A to 13J show a second compensation current signal to which an injection axis is applied and the current signal (FIGS. 11A to 11J) is compensated according to the second embodiment of the present disclosure. Specifically, FIGS. 13A to 13J show the second compensation current signal ($i_{sig}''$) for the first angular error ($\tilde{\theta}_r$) and the torque command ($T_e^*$) at each rotor position ($\theta_r$).

Referring to FIGS. 13A to 13J, since the second compensation current signal ($i_{sig}''$) input to the angle estimator 180 does not have a portion making zero down-crossing near the point where the angular error ($\tilde{\theta}_r$) is 0, the convergence point may be easily determined as a point where the angular error ($\tilde{\theta}_r$) is 0.

Comparison of Simulation and Experiment Result

Figure 14A:
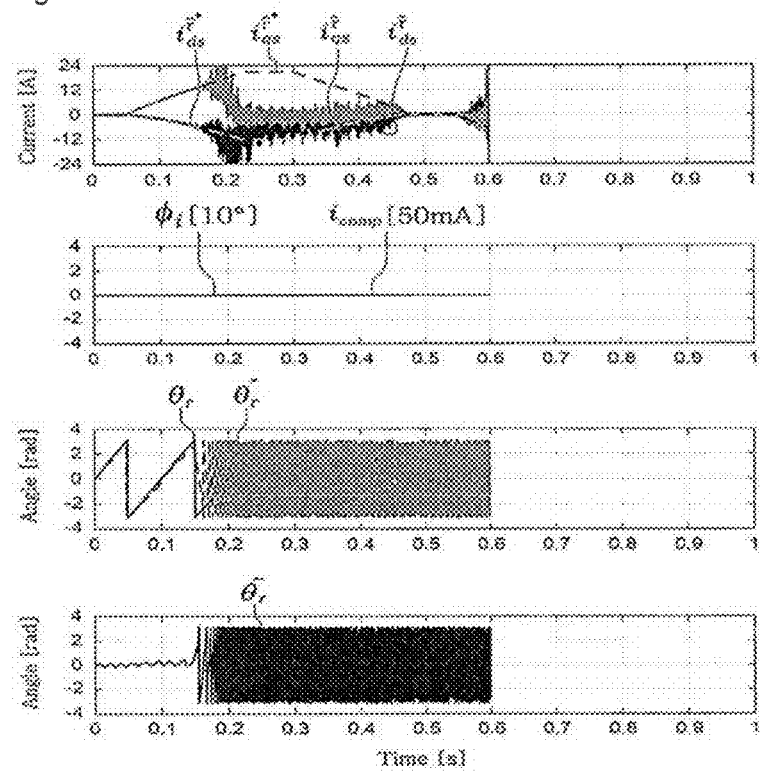
FIGS. 14A and 14B show simulation results according to the conventional technique and the present disclosure.
Figure 14B:
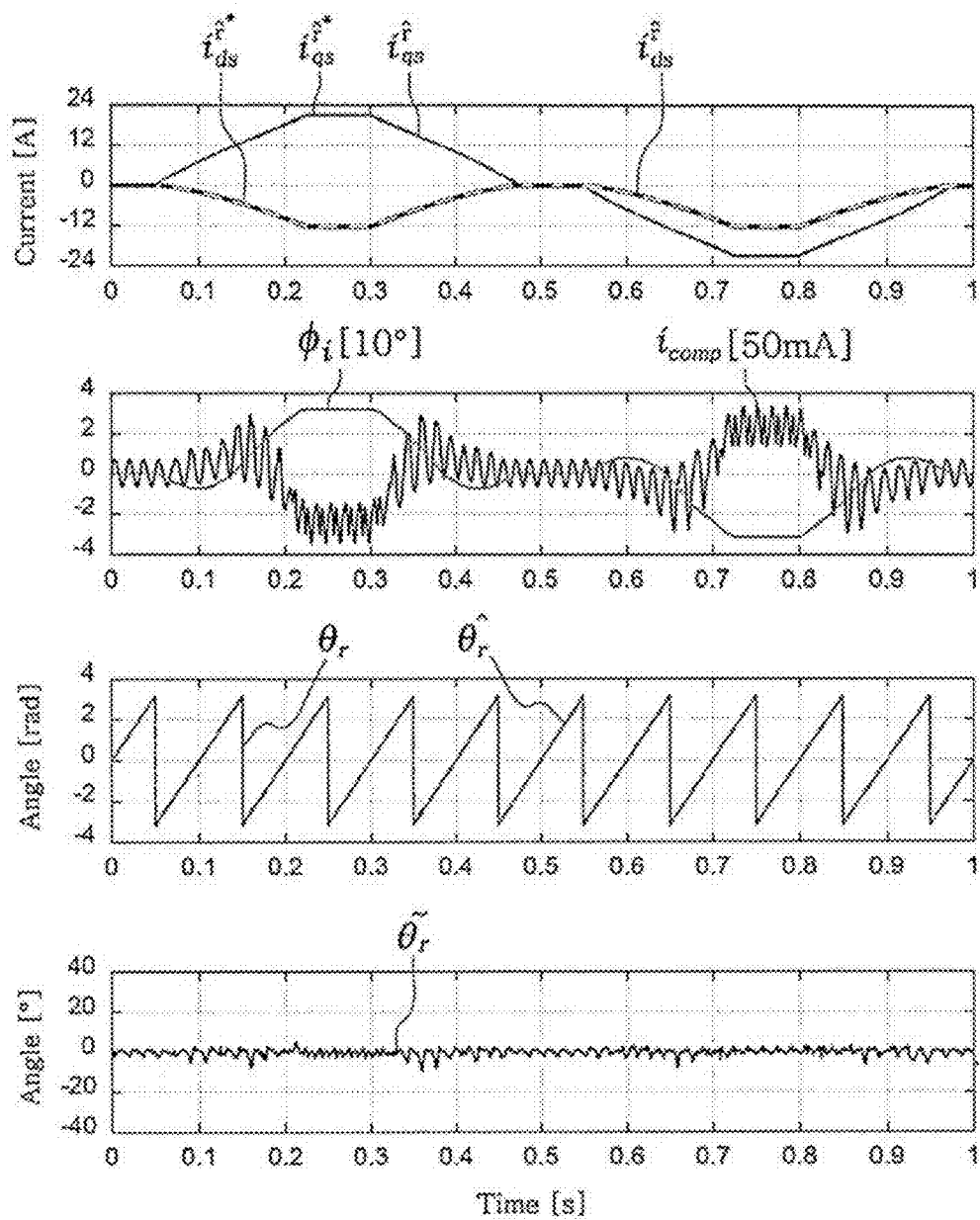

FIGS. 14A and 14B show simulation results according to the conventional method and the present disclosure when the torque command is changed from −3.5 pu to 3.5 pu with a 20 pu/s slope and the speed is 150 r/min. FIG. 14A shows the conventional method, and referring to FIG. 14A, if the torque command reaches 1.7 pu, it is impossible to estimate a position. Meanwhile, FIG. 14B is according to the present disclosure, and referring to FIG. 14B, the position is estimated stably in the entire torque range, and the margin of error does not exceed 10°. Thus, according to the present disclosure, sensorless control is possible in the entire torque range.

Figure 15:
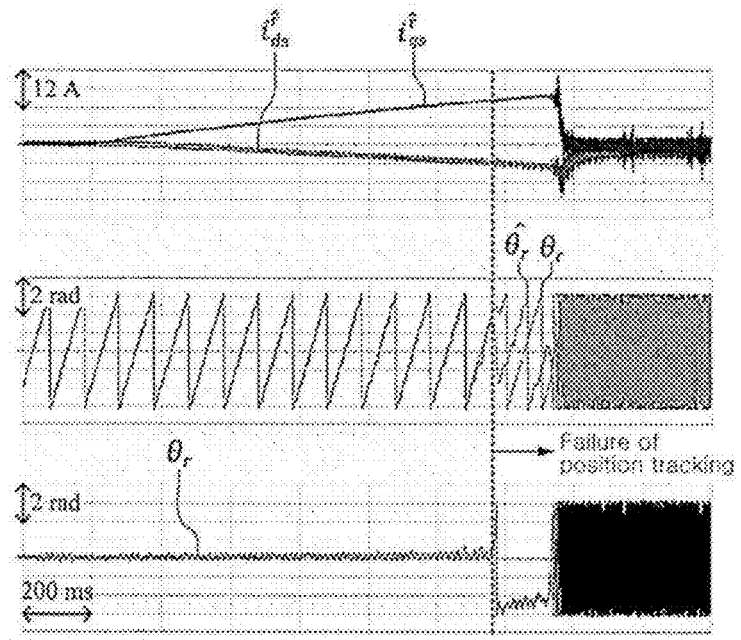
FIG. 15 shows an experiment result where the torque command to the motor is increased with a slope of 2 pu/s while controlling the speed of the motor constantly at 150 r/min according to an embodiment of the present disclosure.

FIG. 15 shows an experiment result where the torque command to the motor is increased with a slope of 2 pu/s while controlling the speed of the motor constantly at 150 r/min according to an embodiment of the present disclosure.

Referring to FIG. 15, it may be found that the estimated position is significantly different if the torque command reaches 2.3 pu, which is consistent with SISL (signal injection sensorless control) feasibility analysis results.

Figure 16A:
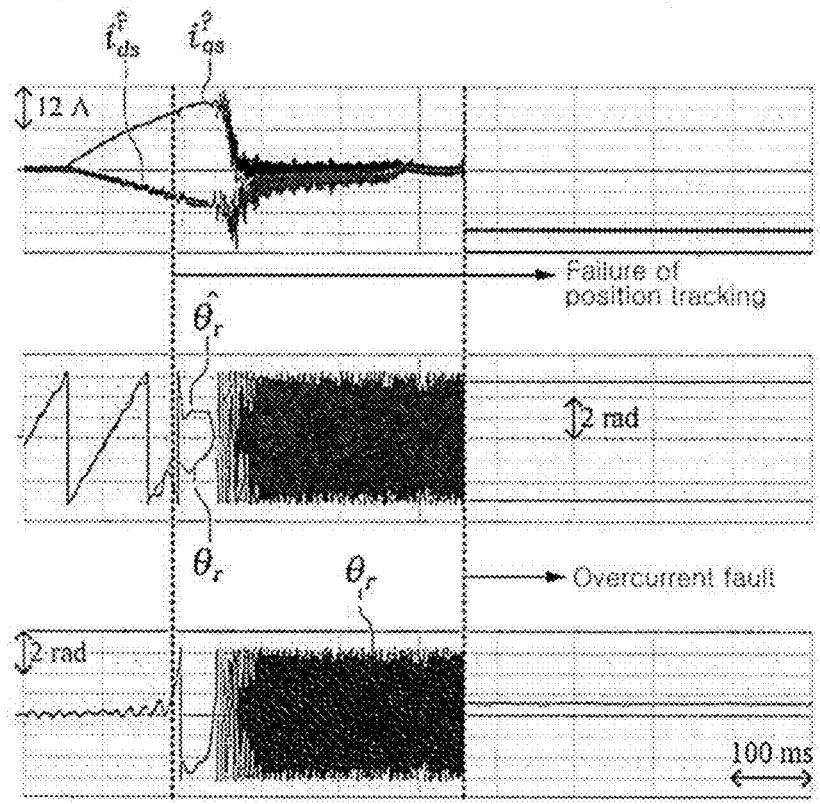
FIGS. 16A and 16B show experiment results of rotor position estimation according to the conventional technique and the present disclosure.
Figure 16B:
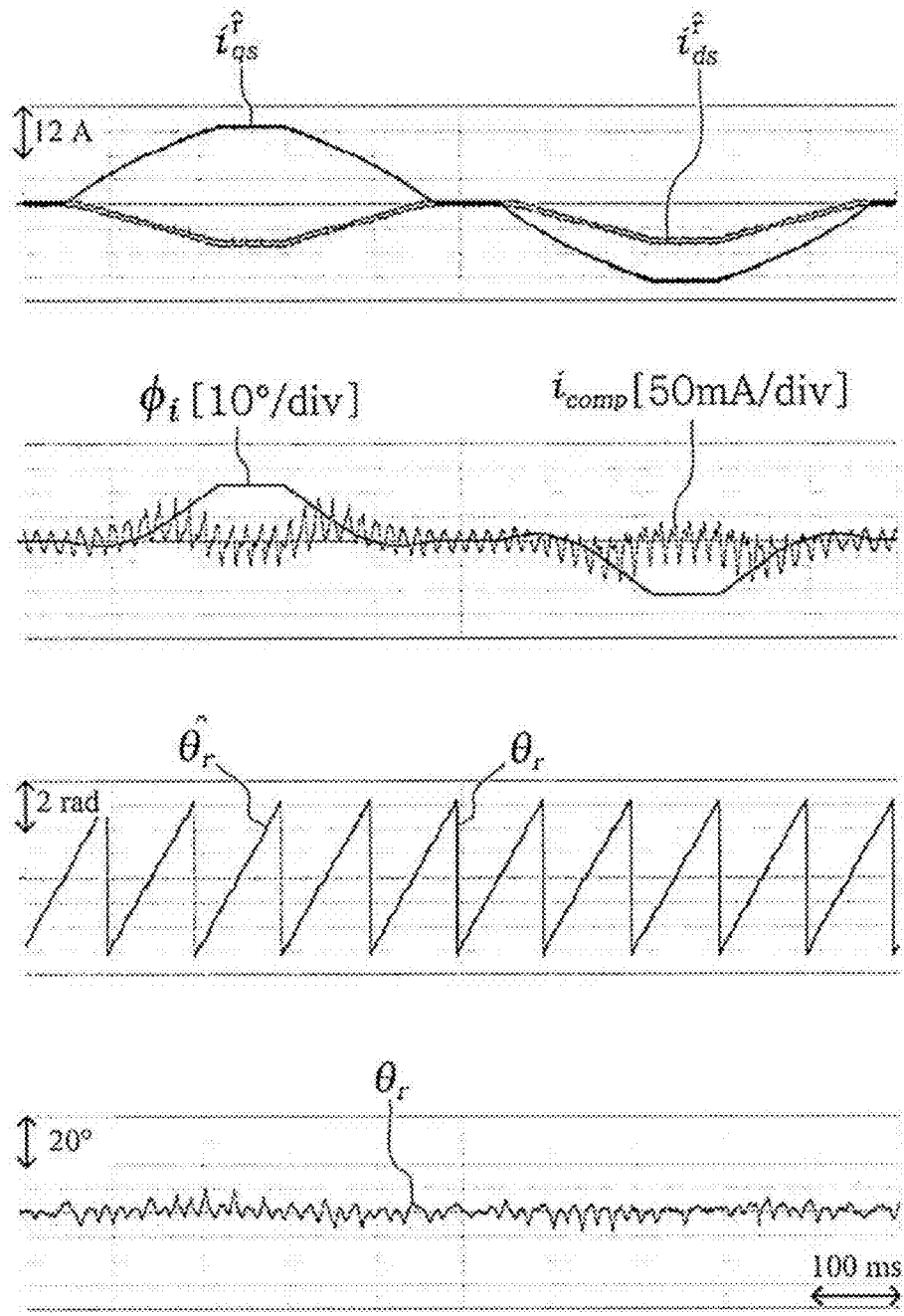

FIGS. 16A and 16B show experiment results of rotor position estimation according to the conventional technique and the present disclosure.

Referring to FIG. 16A, the observer loses the position estimation before the motor controller stops due to an overcurrent fault. However, in FIG. 16B, the observer maintains position estimation performance in the entire torque range from −3.5 pu to 3.5 pu while keeping the position error within ±10°. This indicates that sensorless control is available in the entire torque range by the method of the present disclosure.

Although the present disclosure has been described based on embodiments and drawings that are limited to specific matters such as specific components, or the like, this is merely to help a more comprehensive understanding of the present disclosure, and the present disclosure is limited to the embodiments. Various modifications and variations can be made from this description by those skilled in the art.

Accordingly, the present disclosure should not be limited to the described embodiments, and all equivalents or modifications of the claims as well as the appended claims are to be regarded as falling within the scope of the present disclosure.

REFERENCE SIGNS

100: motor control apparatus
101: motor
110: current controller
120: high frequency voltage generator
130: first coordinate converter
140: inverter
150: second coordinate converter
160: filter
170: compensator
175: reference table storing unit
180: angle estimator

The invention claimed is:

1. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor; and
a compensator for adding a first compensation signal ($i_{comp}$) to the current signal ($i_{sig}$),
wherein the first compensation signal ($i_{comp}$) is related to the torque command and the estimated angle,
wherein the current signal ($i_{sig}$) is obtained by extracting a signal corresponding to a frequency of the high frequency voltage signal from the motor current, and
wherein the current signal ($i_{sig}$) is an estimated q-axis component of the estimated coordinate system.

2. A motor control apparatus, comprising:
a current controller for generating a voltage command signal on the basis of a torque command for driving a motor and a fundamental wave current of the motor;

a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor; and
a compensator for adding a first compensation signal ($i_{comp}$) to the current signal ($i_{sig}$), wherein the first compensation signal ($i_{comp}$) is related to the torque command and the estimated angle,
wherein the angle estimator generates the estimated angle of the rotor of the motor on the basis of a first compensation current signal ($i_{sig}'$) that is a sum of the current signal and the first compensation signal,
wherein the current signal ($i_{sig}$) is a function of the torque command, a position of the rotor of the motor and a first angular error, and the first angular error is a difference between the estimated angle and the position of the rotor, and
wherein the first compensation signal is expressed by the following equation:

first compensation signal ($i_{comp}$)=(−1)*current signal ($i_{sig}$), where first angular error=0°.

3. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor;
a compensator for adding a first compensation signal ($i_{comp}$) to the current signal ($i_{sig}$), and
a reference table storing unit for storing a corresponding relationship reference table of a position of the rotor of the motor and the torque command,
wherein the first compensation signal ($i_{comp}$) is related to the torque command and the estimated angle.

4. The motor control apparatus according to claim 3,
wherein the compensator generates the first compensation signal on the basis of the corresponding relationship reference table stored in the reference table storing unit and a present torque command.

5. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor;
a compensator for adding a first compensation signal ($i_{comp}$) to the current signal ($i_{sig}$), and a first coordinate converter and second coordinate converter,
wherein the first compensation signal ($i_{comp}$) is related to the torque command and the estimated angle,
wherein the first coordinate converter performs reference coordinate transformation to a sum of the voltage command signal and the high frequency voltage signal on the basis of the estimated angle from an estimated synchronous coordinate system to a stationary coordinate system, and
wherein the second coordinate converter performs reference coordinate transformation to the fundamental wave current on the basis of the estimated angle from a stationary coordinate system to an estimated synchronous coordinate system.

6. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor; and
a compensator for adding a first compensation signal ($i_{comp}$) to the current signal ($i_{sig}$),
wherein the first compensation signal ($i_{comp}$) is related to the torque command and the estimated angle,
wherein the high frequency voltage generator generates the high frequency voltage signal in an estimated d-axis on the estimated coordinate system, and
wherein the current signal of the motor is an estimated q-axis component on the estimated coordinate system.

7. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;
an inverter for applying a voltage to the motor on the basis of the voltage command signal and the high frequency voltage signal;
an angle estimator for generating an estimated angle of a rotor of the motor on an estimated coordinate system on the basis of a current signal of the motor; and
a compensator for adding a first compensation signal ($i_{comp}$) to the current signal ($i_{sig}$),
wherein the first compensation signal ($i_{comp}$) is related to the torque command and the estimated angle,
wherein the fundamental wave current input to the current controller is an estimated d-axis component and an estimated q-axis component on the estimated coordinate system.

8. A motor control apparatus, comprising:
a current controller for generating a voltage command signal on the basis of a torque command for driving a motor and a fundamental wave current of the motor;
a high frequency voltage generator for generating a high frequency voltage signal for injecting into the voltage command signal;

an inverter for applying a voltage to the motor on the basis of the voltage command signal and the high frequency voltage signal;

an angle estimator for generating an estimated angle of a rotor of the motor on an estimated coordinate system on the basis of a current signal of the motor; and a compensator for adding a first compensation signal ($i_{comp}$) to the current signal ($i_{sig}$), wherein the first compensation signal ($i_{comp}$) is related to the torque command and the estimated angle, wherein the high frequency voltage generator generates the high frequency voltage signal in an injected d-axis of an injection coordinate system that is rotated from the estimated coordinate system by an injection angle.

9. The motor control apparatus according to claim 8, wherein the current signal is an injected q-axis component on the injection coordinate system.

10. The motor control apparatus according to claim 8, wherein the current signal is expressed as a function of the torque command, a position of the rotor, the injection angle and a second angular error, and the second angular error is a difference between the injection angle and the position of the rotor.

11. The motor control apparatus according to claim 10, further comprising:
a compensator for adding a second compensation signal ($i_{comp}'$) to the current signal ($i_{sig}$), wherein the angle estimator generates an estimated angle of the rotor of the motor on the basis of a compensation current signal ($i_{sig}''$) that is the sum of the current signal and the second compensation signal, and wherein the second compensation signal is expressed by the following equation:

second compensation signal ($i_{comp}'$)=(−1)*current signal ($i_{sig}$), where first angular error=0°.

12. The motor control apparatus according to claim 8, wherein the injected d-axis is ahead of an estimated d-axis by the injection angle.

13. The motor control apparatus according to claim 11, further comprising:
a reference table storing unit for storing a corresponding relationship reference table of the torque command according to the position of the rotor of the motor and the injection angle.

14. The motor control apparatus according to claim 13, wherein the compensator generates a second compensation signal on the basis of the corresponding relationship reference table stored in the reference table storing unit and a present torque command.

15. The motor control apparatus according to claim 14, wherein the injection angle is determined within a range in which a first angular error is 0 and a second compensation current signal becomes 0 while having a positive slope on the basis of the first angular error.

* * * * *